US011025598B1

(12) United States Patent
Laghaeian et al.

(10) Patent No.: US 11,025,598 B1
(45) Date of Patent: Jun. 1, 2021

(54) METHOD AND APPARATUS FOR MANAGING ENCRYPTION KEYS AND ENCRYPTED ELECTRONIC INFORMATION ON A NETWORK SERVER

(71) Applicant: Mockingbird Ventures, LLC, Columbus, IN (US)

(72) Inventors: Cameron Laghaeian, Leesburg, VA (US); Ugo Ferrante, Boca Raton, FL (US); Lori P. Cobb, Columbus, IN (US)

(73) Assignee: Mockingbird Ventures, LLC, Columbus, IN (US)

(*) Notice: Subject to any disclaimer, the term of this patent is extended or adjusted under 35 U.S.C. 154(b) by 0 days.

(21) Appl. No.: 17/169,949

(22) Filed: Feb. 8, 2021

Related U.S. Application Data

(60) Provisional application No. 62/971,941, filed on Feb. 8, 2020.

(51) Int. Cl.
*H04L 29/06* (2006.01)
*H04L 9/08* (2006.01)

(52) U.S. Cl.
CPC ........ *H04L 63/0435* (2013.01); *H04L 9/0825* (2013.01); *H04L 63/083* (2013.01)

(58) Field of Classification Search
CPC .. H04L 63/0435; H04L 9/0825; H04L 63/083
See application file for complete search history.

(56) References Cited

U.S. PATENT DOCUMENTS 5,497,422 A * 3/1996 Tysen ............. G06F 21/64
713/157
5,606,609 A * 2/1997 Houser ............ H04L 9/3236
382/306

(Continued)

*Primary Examiner* — Aravind K Moorthy
(74) *Attorney, Agent, or Firm* — Grady L. White; Potomac Law Group, PLLC

(57) ABSTRACT

Method and apparatus for storing and managing encrypted electronic information, which enables on-demand access to a data owner's encrypted electronic information only to the data owner or to authorized data recipients, and only so long as the authorization is not rescinded by the data owner. The authorized data recipient's access to the data owner's information is limited solely to those portions of the data owner's encrypted electronic information designated by the data owner. Moreover, the authorized data recipient's limited access to the encrypted electronic information is accomplished without ever revealing or exposing the data owner's secret or private encryption key(s) to the authorized data recipient. The data owner can also immediately disable this access at any time by rescinding the access authority, if so desired, thereby terminating the authorized recipient's access to any existing information on the system, or any additional information yet to be uploaded, encrypted and stored on the system. Thus, embodiments of the present invention also enables rescinding and terminating such granted access without the data owner having to discard and replace their private encryption keys. Not even the operators and administrators of the apparatus can gain access the unencrypted information or unencrypted private keys of the data owner without the express authorization of the data owner.

23 Claims, 12 Drawing Sheets

(56) References Cited

U.S. PATENT DOCUMENTS

| | | | | |
|---|---|---|---|---|
| 5,687,235 A * | 11/1997 | Perlman | H04L 9/3268 | 380/30 |
| 6,170,058 B1 * | 1/2001 | Kausik | G06F 21/6245 | 713/193 |
| 6,233,565 B1 * | 5/2001 | Lewis | G06Q 20/00 | 705/26.1 |
| 6,330,677 B1 * | 12/2001 | Madoukh | G06F 21/445 | 726/2 |
| 6,694,025 B1 * | 2/2004 | Epstein | H04L 9/0894 | 380/279 |
| 6,738,907 B1 * | 5/2004 | Carter | H04L 9/0891 | 726/9 |
| 6,829,712 B1 * | 12/2004 | Madoukh | G06F 21/445 | 709/200 |
| 6,978,385 B1 * | 12/2005 | Cheston | G06F 21/31 | 340/5.85 |
| 8,621,208 B1 * | 12/2013 | Hu | H04L 63/061 | 713/165 |
| 9,602,508 B1 * | 3/2017 | Mahaffey | H04W 12/084 | |
| 9,954,848 B1 * | 4/2018 | Stoica | H04L 29/06775 | |
| 10,657,275 B2 * | 5/2020 | Itamar | G06F 21/6218 | |
| 10,963,584 B2 * | 3/2021 | Safa | H04L 63/083 | |
| 2002/0004902 A1 * | 1/2002 | Toh | H04L 63/0442 | 713/170 |
| 2002/0083327 A1 * | 6/2002 | Rajasekaran | H04L 9/0863 | 713/182 |
| 2002/0141575 A1 * | 10/2002 | Hird | H04L 9/3247 | 380/44 |
| 2002/0178366 A1 * | 11/2002 | Ofir | G06F 21/6245 | 713/182 |
| 2002/0199119 A1 * | 12/2002 | Dunnion | H04L 63/0428 | 726/4 |
| 2003/0046572 A1 * | 3/2003 | Newman | H04L 9/0891 | 713/193 |
| 2003/0063744 A1 * | 4/2003 | Parry | G06F 21/608 | 380/51 |
| 2003/0123671 A1 * | 7/2003 | He | H04L 9/0894 | 380/282 |
| 2003/0142364 A1 * | 7/2003 | Goldstone | H04L 63/0435 | 358/402 |
| 2004/0205344 A1 * | 10/2004 | Otway | H04L 9/3273 | 713/169 |
| 2006/0064463 A1 * | 3/2006 | Chan | G06F 21/6218 | 709/206 |
| 2006/0190724 A1 * | 8/2006 | Adams | G06F 21/71 | 713/166 |
| 2007/0118479 A1 * | 5/2007 | Halsema | G06Q 20/382 | 705/51 |
| 2009/0106561 A1 * | 4/2009 | Ejiri | H04L 9/3236 | 713/193 |
| 2009/0110198 A1 * | 4/2009 | Garimella | G06F 21/6209 | 380/277 |
| 2009/0279703 A1 * | 11/2009 | McLane | H04L 9/0844 | 380/279 |
| 2010/0100721 A1 * | 4/2010 | Su | G06F 11/1456 | 713/150 |
| 2010/0161965 A1 * | 6/2010 | Solin | H04L 9/3268 | 713/155 |
| 2010/0250441 A1 * | 9/2010 | Coppinger | G07F 7/1075 | 705/67 |
| 2010/0306547 A1 * | 12/2010 | Fallows | G06F 21/31 | 713/178 |
| 2011/0099366 A1 * | 4/2011 | Kalliola | H04L 51/00 | 713/153 |
| 2011/0296171 A1 * | 12/2011 | Fu | H04L 9/0825 | 713/156 |
| 2011/0296172 A1 * | 12/2011 | Fu | H04L 9/0825 | 713/156 |
| 2012/0082312 A1 * | 4/2012 | Liu | H04L 9/0844 | 380/262 |
| 2012/0131345 A1 * | 5/2012 | Dadu | H04L 9/3228 | 713/176 |
| 2012/0170753 A1 * | 7/2012 | Pandrangi | G06F 21/6209 | 380/286 |
| 2012/0239928 A1 * | 9/2012 | Judell | H04L 9/30 | 713/168 |
| 2012/0294445 A1 * | 11/2012 | Radutskiy | H04L 9/0863 | 380/278 |
| 2012/0310840 A1 * | 12/2012 | Colombo | G06Q 20/385 | 705/73 |
| 2012/0317239 A1 * | 12/2012 | Mulder | H04L 9/0861 | 709/219 |
| 2012/0317414 A1 * | 12/2012 | Glover | G06F 21/602 | 713/165 |
| 2013/0024695 A1 * | 1/2013 | Kandrasheu | H04L 9/006 | 713/175 |
| 2013/0091359 A1 * | 4/2013 | Guo | H04W 12/033 | 713/171 |
| 2014/0068279 A1 * | 3/2014 | Kurspahic | H04L 9/3226 | 713/193 |
| 2014/0143548 A1 * | 5/2014 | Wang | H04L 9/0897 | 713/171 |
| 2014/0173287 A1 * | 6/2014 | Mizunuma | H04L 63/0407 | 713/176 |
| 2014/0281574 A1 * | 9/2014 | Webb | G06F 21/602 | 713/189 |
| 2014/0317401 A1 * | 10/2014 | Lee | H04L 63/061 | 713/156 |
| 2015/0113279 A1 * | 4/2015 | Andersen | G06F 21/6218 | 713/171 |
| 2015/0134962 A1 * | 5/2015 | Mahajan | H04L 63/061 | 713/171 |
| 2015/0172260 A1 * | 6/2015 | Brenner | H04L 63/083 | 713/171 |
| 2016/0080157 A1 * | 3/2016 | Lundstrom | H04L 9/3247 | 713/176 |
| 2016/0191470 A1 * | 6/2016 | Movalia | H04L 9/14 | 713/171 |
| 2016/0241397 A1 * | 8/2016 | Adam | H04L 9/0894 | |
| 2016/0241558 A1 * | 8/2016 | Adam | H04L 63/0876 | |
| 2017/0063531 A1 * | 3/2017 | Sullivan | G06F 21/45 | |
| 2017/0126642 A1 * | 5/2017 | Basin | H04L 9/3247 | |
| 2017/0208049 A1 * | 7/2017 | Hu | H04L 63/061 | |
| 2017/0330180 A1 * | 11/2017 | Song | G06F 21/33 | |
| 2018/0123790 A1 * | 5/2018 | Itamar | H04L 9/088 | |
| 2018/0323972 A1 * | 11/2018 | Reed | G06F 3/017 | |
| 2019/0215157 A1 * | 7/2019 | Guo | H04L 9/0863 | |
| 2019/0243631 A1 * | 8/2019 | Sharma | G06F 21/572 | |
| 2019/0334884 A1 * | 10/2019 | Ross | G06F 21/41 | |
| 2019/0347435 A1 * | 11/2019 | Zheng | G06F 21/6209 | |
| 2020/0021448 A1 * | 1/2020 | Chumbley | H04L 9/3271 | |
| 2020/0143367 A1 * | 5/2020 | LeBeau | H04L 9/3297 | |
| 2020/0219094 A1 * | 7/2020 | Dikhit | H04L 9/0863 | |
| 2020/0234267 A1 * | 7/2020 | Sanders | G06Q 20/047 | |
| 2020/0244448 A1 * | 7/2020 | Binz Vallevik | H04L 63/045 | |
| 2021/0021429 A1 * | 1/2021 | Truu | H04L 9/3073 | |

* cited by examiner

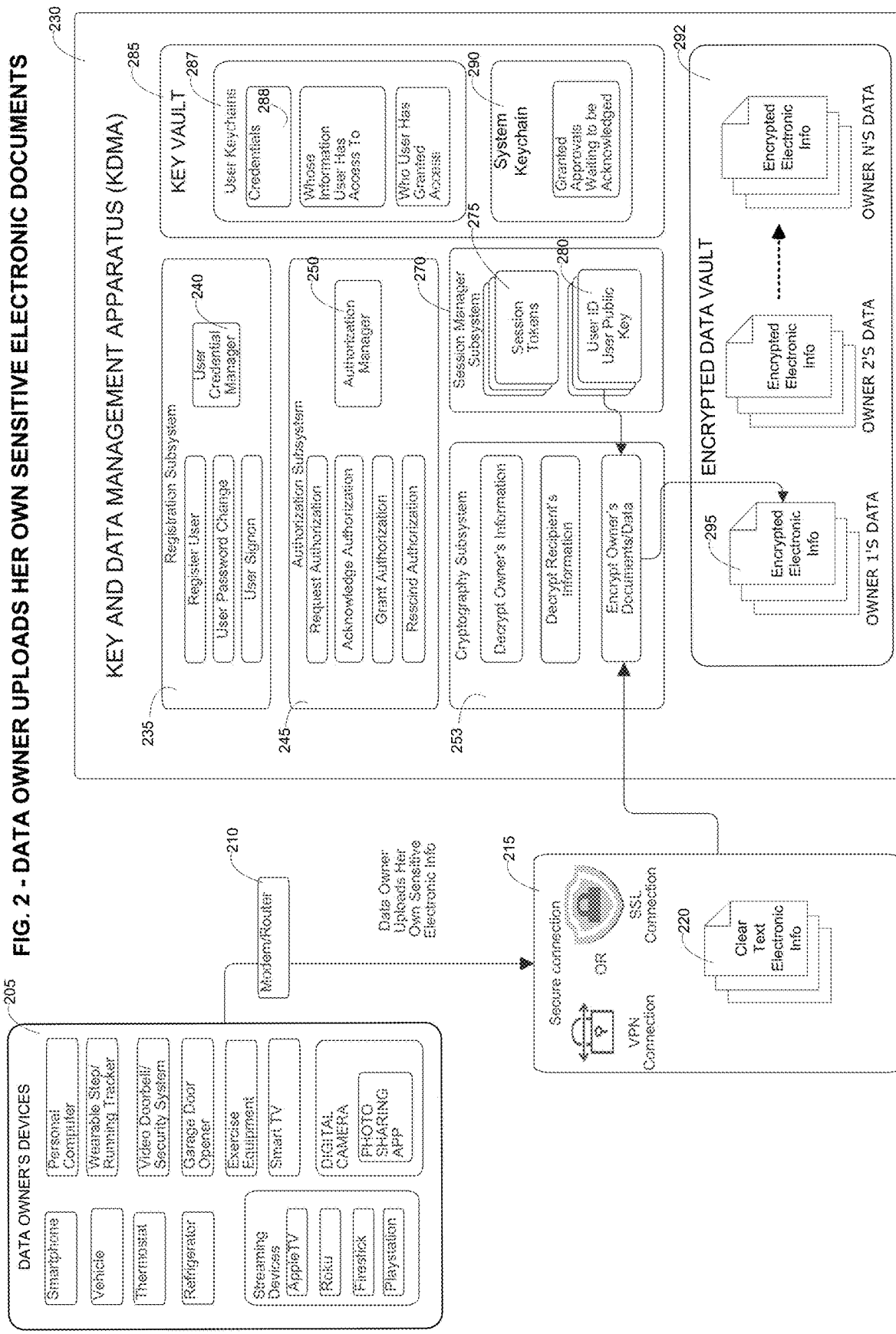
FIG. 2 - DATA OWNER UPLOADS HER OWN SENSITIVE ELECTRONIC DOCUMENTS

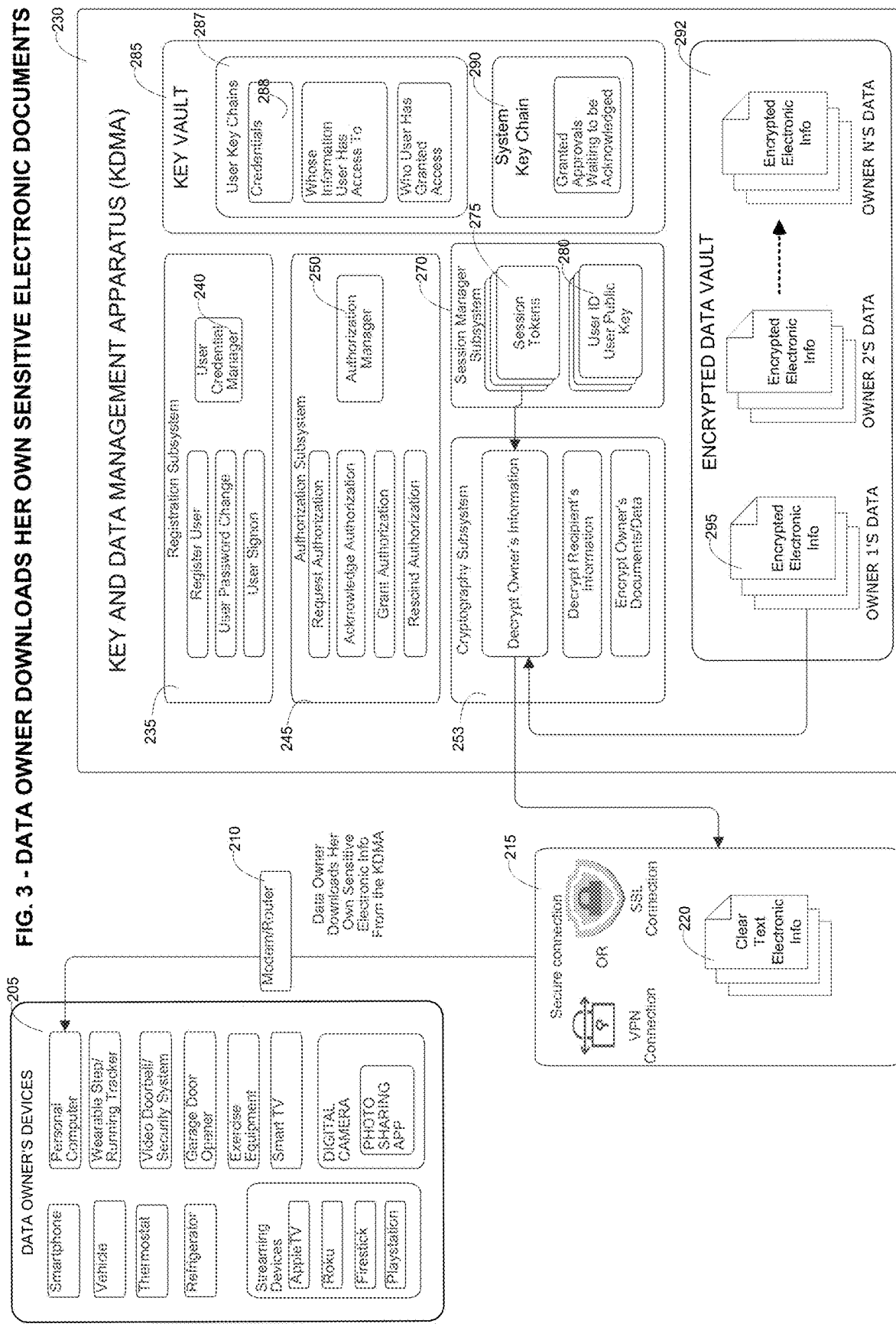
FIG. 3 - DATA OWNER DOWNLOADS HER OWN SENSITIVE ELECTRONIC DOCUMENTS

User Credential Manager – Data Owner Passcode Change – Updating the Keychains of Authorized Data Recipients

METHOD AND APPARATUS FOR MANAGING ENCRYPTION KEYS AND ENCRYPTED ELECTRONIC INFORMATION ON A NETWORK SERVER

Method and Apparatus for Managing Encryption Keys and Encrypted Electronic Information on a Network Server

FIELD OF THE INVENTION

The present invention relates to systems, methods and apparatus for storing and sharing access to sensitive electronic information that is encrypted and stored on a computerized data communications network.

BACKGROUND OF THE INVENTION

In today's device-dependent, Internet-connected and data-driven society, a vast amount of sensitive electronic information is constantly being generated, collected, compiled and stored on local memory devices and/or uploaded to online servers for processing and archiving. Sensitive electronic information may include, for example, any type of information that can be stored in electronic form on memory storage devices associated with a computer system or network, and which may be considered by any person, entity or organization to be personal, private, confidential, secret, embarrassing and/or intrinsically useful or valuable for any purpose. Examples of sensitive electronic information may include, without limitation, files, records, reports, facts, studies, statistics, databases, email messages, text, text messages, images, videos, movies, audio recordings, compilations, plans, programs, instructions, source code, object code, executable code, credentials, user IDs, usernames, passwords, passcodes, commercial sales data, financial data, healthcare data, cellphone location data, workout history data, online streaming data, telematics data, traffic data, social networking data, government data, personal data, and many other types of data. Sensitive electronic information may also include smartphone location "pings" off of cell towers, which can used to reconstruct and trace the location and movements of the person carrying the smartphone wherever they go, and often with an accuracy down to within a few feet.

Increasingly, more and more consumer and commercial products and devices are configured to automatically connect to the Internet, and to generate, capture and upload sensitive electronic information to online servers. Such consumer products and devices may include, for example, smart thermostats, smart refrigerators, smart TVs, stereo equipment, exercise equipment, surveillance and alarm systems, doorbells, garage door openers, and even consumer vehicles, such as cars, SUVs and trucks, to say nothing of all the computers, smartphones, smartphone apps, tablet computers, smart watches, e-readers, personal step trackers and other Internet-enabled or cloud-based gadgets that are now almost ubiquitous in most households and businesses.

The constant collection and storage of sensitive electronic information by most of the Internet-connected devices we use on a daily basis has created a number of unexpected, and often unrecognized, problems in a variety of different industries. In the automobile industry, for example, modern vehicles contain telematics boxes, as well as a host of other onboard computers, such as "infotainment" systems, that record and store an enormous amount of data documenting almost all of the vehicles' activities and operations, including interactions between the vehicles' drivers and the vehicles. The recorded activities and operational details may include, for example, operating temperatures, oil and gas levels, engine performance data, vehicle speed, acceleration, deceleration, when and where the lights were switched on or off, fastening and unfastening of seat belts, application of brakes, airbag deployments, etc. Additionally, any information gathered by the sensors, such as outside temperature, tire pressure, lateral acceleration, etc. are also recorded. Beyond information that pertains to the health and optimal operation of the vehicle, any activity attempted by the driver is also recorded and stored in the telematics box of the vehicle. This information can include the vehicle's location, and even the opening, closing, locking and unlocking of the vehicle's doors.

Additionally, any interaction that involves a driver's use of the infotainment or navigation systems are recorded and stored in the vehicle's onboard memory devices, including voice commands used by the driver to specify destinations, ask for directions, or play a specific song. The infotainment system also may record recent destinations, call logs, contact lists, text messages, emails, pictures, videos, web histories, voice commands and social media feeds. It can also keep track of smart phones that are connected to the vehicle via USB cable or Bluetooth, as well as the apps installed on the smartphone. All of this information, which may be considered by most drivers to be personal and private, may be recorded and stored within the telematics box. A lot of this information may also be transmitted to a central server operated by the manufacturer of the vehicle, or a third-party operator of the telematics system for various reasons, such as service and maintenance or to provide immediate roadside assistance.

In most cases, sensitive electronic information collected, stored and potentially uploaded to a central server by the vehicle occurs without the knowledge or consent of the vehicle's owner and/or driver. This is especially true with rented and/or leased vehicles. Importantly, upon the sale or transfer of the vehicle to another owner, or the return of a rented or leased vehicle, the sensitive electronic data generated by the previous owner, previous renter or previous lessor, usually remains on the memory storage device of the telematics box inside the vehicle. Thus, anyone with the proper skills and the proper tools can gain access to this sensitive electronic information and use it for any purpose. Moreover, most or all of the sensitive electronic information transmitted from the vehicle's telematics box up to a central server, including all the navigational data, engine data, entertainment preferences, voice commands, synced smartphone data, etc., typically remains on the central server indefinitely, where, if it is not adequately secured and protected, may be accessed, stolen, sold and/or used for illegal or dodgy purposes by unscrupulous businesses, employees or professional hackers. In the hands of bad actors, the sensitive electronic information could be used to blackmail, embarrass, steal the identity or inflict harm on the vehicle's owner. The sensitive electronic information could also be turned over to government and law enforcement authorities pursuant to warrants, subpoenas and/or court orders, all without the owner's knowledge or consent. Digital vehicle forensics, which focuses on extracting data stored in automobiles' onboard computers and on online servers is a fast-growing, emerging field in law enforcement because it often permits detectives to determine exactly where a vehicle was located and what its passengers were doing at the time of a crime. Alarmingly, the location data collected about the vehicle could also be used for real-time or after-the-fact tracking and surveillance.

Similar situations exist in many other industries, such as consumer electronics, healthcare, consumer credit reporting, government regulation and taxation, national security, or any other industry where a great deal of sensitive electronic data is constantly and routinely collected, stored on online servers, and shared among different parties. For example, in the healthcare industry of the United states, healthcare organizations are constantly grappling with the rules of the Health Insurance Portability and Accountability Act ("HIPAA"), which stipulates that patient records must be kept confidential. Yet, patient medical records are almost always stored in large databases in unencrypted form on centralized servers. The sensitive electronic information stored in the records of these large databases typically includes diagnoses, prescriptions, lab results, charts, etc. for thousands, if not hundreds of thousands, of patients. Usually, the only form of protection used to protect against unauthorized access to such patient records is "restricted access control," which means the databases cannot be accessed without logging in with a valid username and password. But if an unauthorized person manages to acquire a valid username and password, or otherwise figures out a way to bypass the login procedure, then that person can easily steal sensitive electronic information, including private patient records, from the database. In some cases, a hacker may even be able to steal a copy of the entire database, delete the database, or otherwise prevent access to the records in the database unless and until the owner of the database pays a ransom to the hacker. Unfortunately, it is relatively easy for skilled bad actors to gain access to the usernames and passwords because they are typically written down and/or stored in unsecure locations by healthcare providers and insurance workers in doctors' offices, labs, pharmacies, hospitals, insurance companies, etc. who regularly access the online databases. The information may be leaked or hacked or bought or sold to bad actors and abused. Once a hacker or other unauthorized person gains access to the computers and servers where the health information is stored, they can access, steal, delete and/or redistribute and enormous volume of private patient information.

Various methods and techniques have been introduced to try to protect sensitive electronic information stored and shared on online servers from unauthorized access. One of the most widely used methods involves using encryption technology. As illustrated by the schematic diagram shown in FIGS. 1A and 1B, there are two kinds of encryption technology. Symmetric encryption (FIG. 1A) is a type of data encryption in which computer programs use encryption algorithms and the same key (a "secret key") to both encrypt and decrypt the sensitive electronic information. When symmetric encryption algorithms are used, the sensitive electronic information is converted to an encrypted (and therefore, practically undecipherable) form that cannot be understood or decrypted by anyone or any computer program that does not have access to a copy of the same secret key that was used to encrypt the information. Thus, if the encrypted sensitive electronic information is to be shared between two parties, then both parties must have access to copies of the same secret key.

If the owner of a data file containing sensitive electronic information stores (or allows the storage of) the data file in an online database, then he or she could try increasing the level of protection on the data file stored in an online database (beyond the level of protection afforded by username/password-based access control), by allowing a program running on the server (or a program running on the data owner's local computer system) to execute an encryption algorithm that uses the data owner's secret key to encrypt the data file and/or the sensitive electronic information contained in the data file. When the data owner wants to retrieve the data file and sensitive electronic information from the online server, the data owner runs another computer program, which uses the same secret key and a decryption algorithm to reverse the actions of the encryption algorithm. The decryption algorithm converts the sensitive electronic information back to its original, comprehensible form. The secret key may comprise, for example, a specific passcode (such as a password) entered by the data owner. The secret key could also comprise a string of random letters and/or numbers that has been generated using a secure random number generator (RNG). If the data owner wants to grant access to another party, i.e., an authorized data recipient, to see the information in unencrypted form, then the data owner must share the secret key with the authorized recipient so that the authorized data recipient can decrypt the encrypted data file.

Unlike symmetric encryption, asymmetric encryption (illustrated by the schematic diagram in FIG. 1B), also known as "Public-key Cryptography," encrypts and decrypts sensitive electronic information using two separate, yet mathematically connected cryptographic keys. These keys are known as a "public key" and a "private key." Together, a public key and corresponding private key are referred to as a "public/private key pair." Each person or party using asymmetric encryption to store, protect and share sensitive electronic information will have an assigned public/private key pair.

When sensitive electronic information is encrypted with a recipient's public key, the only way the information can be decrypted is with the recipient's private key. Therefore, when the owner of a file containing sensitive electronic information wants to provide the sensitive electronic information to an authorized data recipient, the data file's owner (or a program running on the server) may obtain and use a copy of the authorized data recipient's public key to encrypt the data file. The encrypted data file is then transmitted to (or otherwise made available on the server) to the authorized recipient. Then a program running on the server, or the authorized recipient's computer system, uses the authorized recipient's assigned private key to decrypt the data file. No other party, entity or computer system that does not have a copy of the authorized recipient's private key will be able to decrypt and read the encrypted data file. In many cases, the encryption and decryption steps carried out by the programs running on the sender's computer system, the server, or the authorized recipient's computer system, respectively, carry out the encryption and decryption steps automatically, without the sender or the authorized recipient of the file ever realizing that this is occurring.

The actual encryption and decryption of sensitive information, and the storing and management of public and private keys associated with the encryption and decryption, are handled automatically by computer networks operating under the control of programming instructions embodied in various encryption key management programs and subsystems stored in the memories, or otherwise associated, with such computer networks. Unfortunately, however, conventional cryptographic data protection and sharing systems suffer from several significant problems and shortcomings that severely limit their utility in situations where sensitive encrypted information stored on a server needs to be shared with other parties. None of these problems have ever been solved prior the present invention.

First, the conventional cryptographic data protection and sharing systems do a very poor job of enabling or facilitating the sharing of encrypted documents because they are, by definition, primarily designed to protect documents from being viewed by anyone other than the owner of the private keys. Suppose, for example, the owner of an encrypted data file that is stored on an online server wants (or needs) to share the contents of an encrypted data file with another trusted party, such as a potential customer, a potential investor or a potential business partner. Before the data file was stored on the server, it was encrypted using the data owner's public key so that the only way the data file can be decrypted is by using the data owner's private key, which no one, other than the data owner of course, possesses. How can the data owner share the information within the data file with authorized data recipient? Merely sending the encrypted data file to the authorized data recipient, or granting the authorized data recipient the right to access the encrypted data file will not achieve the desired result, unless the data owner also provides the authorized data recipient with a copy of the data owner's private key so that the authorized data recipient will be able to decrypt the data file. For very good reasons, however, data owners are typically unwilling, or extremely reluctant, to give copies of their private keys to other parties. In fact, sharing private keys, like sharing passwords, are strongly discouraged because any party having access to a copy of a data owner's private key can use the private key to decrypt any and all data files that have ever been encrypted with the data owner's public key. Not only will the other party be able to view all of the data owner's encrypted private information, the other party may even be able to use the data owner's private key to intercept, steal and/or manipulate any newly encrypted messages and/or confidential data intended solely for the data owner.

Furthermore, if the data owner ever needs to stop sharing information with the authorized data recipient (beyond what has already been shared), and prevent the other party's continued access to the data owner's encrypted information, the only way for the data owner to accomplish it is to use the data owner's private key to methodically decrypt all the information that has previously been encrypted with the data owner's public key, discard the existing private/public key pair, acquire a new private/public key pair, re-encrypt all the information with the new public key, and then refrain from sharing the new private key with any other party. This complex and time-consuming procedure may be nearly impossible to accomplish completely, depending on how large the collection of the previously encrypted information is, where the information is currently located, and how many times it has been copied and/or transmitted to various other computers throughout a computer network.

To avoid sharing their private keys with other parties, and potentially having to later discard their private/public key pairs and obtain new ones, data owners who need or want to share encrypted data will frequently decrypt the data file themselves, and then transmit the data file to the authorized recipient (over a data communications network) in unencrypted form (sometimes referred to as "clear text" form). Unfortunately, this practice of exchanging sensitive electronic information in unencrypted form over a data communications network, such as the Internet, is risky because it exposes the sensitive electronic information in the data file to anyone with the skill and/or equipment to eavesdrop on the information transmission medium, and thereby tends to defeat most or all of the previous efforts to protect the sensitive electronic information from falling into the wrong hands. This risk increases exponentially in situations where the data owner needs or wants to share the encrypted information with multiple other parties.

Another approach that is sometimes used by data owners to share the sensitive electronic information with an authorized data recipient is to decrypt the encrypted data file using the data owner's private key, and then re-encrypt the data file with the authorized data owner's public key. Although this will permit the authorized data recipient to decrypt the encrypted data file with the authorized recipient's own private key, it is usually very time-consuming, extremely cumbersome, a waste of computer resources, and requires that the data owner do a lot of extra work, such as acquiring and remembering an up-to-date copy of the authorized data recipient's public key, which may periodically change. This cumbersome and time-consuming process may also be completely unmanageable in those situations where (1) a data file needs to be shared with multiple other parties simultaneously, (2) many data files need to be shared, and/or (3) due to the nature of the transaction, a single data file needs to be edited and shuttled back and forth between the data owner and the authorized data recipient. Every single document that needs to be shared would have to be decrypted with the sharer's private key and re-encrypted with the recipient or recipients' public key(s). This level of complexity typically means the document would be decrypted and shared in unencrypted format utilizing a third-party solution for document sharing in a secure manner. This means the document would be stored in unencrypted form on a third-party storage device susceptible to potential unauthorized access by hackers or even the personnel who manage and operate the third-party document storage.

Another problem associated with conventional cryptographic data protection and sharing systems is that they do a very poor job of helping users manage the keys, which are randomly selected characters of various lengths that can be 1024 characters or longer. This is because encryption keys are, by definition, configured to be stored and managed by computers. As such, the actual sequence of characters that comprise the keys are not amenable to being committed to memory by humans. This has meant that any single user can and will potentially have any number of public/private key pairs that are issued and managed by multiple issuing authorities automatically upon the users' usage of any computer system that provides encryption services. Any attempt to centralize and manage encryption services by a user through securing and managing their own public/private keypairs will immediately present a challenge as to recording and recalling the actual character sequences for the keys. Because of the multiplicity of key pairs for each user, data files that are encrypted using any particular platform or application typically cannot be decrypted using a different platform or application. As an example, there are a number of widely used email clients on the market that utilize private/public keys to encrypt sent email messages and decrypt received email messages so that the confidentiality of those email messages are protected from eavesdropping during transmission over the data communications network. However, unless the same email client (and sometimes the same version of the same email client) is used at both ends of the transmission, it may be impossible for the email client on the receiving end of an encrypted email message to decrypt the message. Thus, an email message received by the email client operating on a smartphone may not be able to decrypt and display an email message that was encrypted and sent from a Windows® personal computer. This limitation often leads to users having to operate multiple email clients on the same device in order to ensure that they will be able to read emails sent from a variety of different platforms and programs.

The above-described limitations and drawbacks have driven many users to avoid the prospect of managing keys by relying on third party document vaults, which control access to the documents using another method of protection known as Access Control Lists (ACL). The ACL method is specifically implemented to facilitate sharing of sensitive electronic information among a group of parties, all of whom may be engaged in a collaboration or business transaction. However, to avoid all the cumbersome procedures required for sharing encrypted information, the sensitive electronic information is stored in the vaults in unencrypted (clear text) form, which means if the ACL is compromised for any reason, any bad actor who gains unauthorized access to the vaults will be able to read and use the sensitive electronic information. Moreover, administrators, employees and agents that work for the third party company that manages and operates the ACL and the vaults will also be able to access, read and potentially steal and profit from their access to the clear text sensitive electronic information.

Accordingly, there is a tremendous need in the electronic information management and computing industries for a safer, less cumbersome and more secure cryptographic data storage, protection and sharing system for sensitive electronic documents encrypted and stored on devices and online servers, which enables granting access to the encrypted information by other authorized parties. There is also considerable need for such a cryptographic data storage, protection and sharing system to be able to store and share the encrypted sensitive electronic information without ever storing the sensitive electronic information in unencrypted (clear text) form in any persistent memory device of the online server. There is also a significant need for a cryptographic data storage, protection and sharing system that enables the sharing of the encrypted information without ever revealing (or exposing) the private key of any registered user to any unauthorized hacker, to any other registered user, or to any administrator, employee or agent of the entity that manages and operates the online server where the sensitive electronic information is stored. There is also a need for a cryptographic data storage, protection and sharing system that can automatically terminate a previously authorized user's access to encrypted sensitive electronic information upon receiving an instruction from the data owner to revoke such access.

SUMMARY OF THE INVENTION

Embodiments of the present invention address and solve the above-described problems and disadvantages associated with conventional encrypted data storage systems by providing an encryption key and data management apparatus (KDMA) for electronic information, which enables on-demand access to a data owner's encrypted electronic information only to the data owner or authorized data recipients, and only so long as the authorization is not rescinded by the data owner. The authorized data recipient's access to the data owner's information is limited solely to those portions of the data owner's encrypted electronic information designated by the data owner. Moreover, the authorized data recipient's limited access to the encrypted electronic information is accomplished without ever revealing or exposing the data owner's secret or private encryption key(s) to the authorized data recipient. The data owner can also immediately disable this access at any time by rescinding the access authority, if so desired, thereby terminating the authorized recipient's access to any existing information on the system, or any additional information yet to be uploaded, encrypted and stored on the system. Thus, embodiments of the present invention also enables rescinding and terminating such granted access without the data owner having to discard and replace their cryptography keys.

The system and method of the present invention also enables complete privacy and security for the data owner's electronic information by rendering even the owner, operator or administrator of the KDMA incapable of accessing and decrypting the data owner's sensitive electronic information without the specific authority to do so, which can only be granted by the data owner using the data owner's password. Importantly, after its initial set up and verification during the client admin account setup, the data owner's passcode and private key(s), as well as the authorized data recipient's password(s) and private key(s) will only exist in their unencrypted forms in transient memory used during a user's session, and are never stored in any persistent memory storage area in readable format.

In general, embodiments of the present invention provide a process for managing encryption keys and encrypted electronic information on a network server. The network server can be any computer system connected to a data communications network and that is used as a central repository of encrypted data and various programs that are shared by other computers connected to the data communications network. The data communications network can be any local or wide area network, including the Internet or a corporate intranet.

The process comprises the steps of:

(A) acquiring on the network server a data owner's public key, a data owner's private key, a data owner's passcode, an authorized data recipient's public key, an authorized data recipient's private key and an authorized data recipient's passcode;

(B) using data owner's passcode to encrypt the data owner's private key, and using the authorized data recipient's passcode to encrypt the authorized data recipient's private key;

(C) saving the data owner's public key and the data owner's encrypted private key in a data owner keychain on a non-volatile secondary memory device connected to the network server, and saving the authorized data recipient's public key and the authorized data recipient's encrypted private key in an authorized data recipient keychain for the authorized data recipient on the non-volatile secondary memory device;

(D) saving the data owner's private key and the authorized data recipient's private key only on a volatile memory device connected to the network server;

(E) uploading a data owner's electronic information to the volatile memory device on the network server, encrypting the data owner's electronic information using the data owner's public key, and saving the data owner's encrypted electronic information on the non-volatile secondary memory device;

(F) receiving on the network server an authorization from a data owner to give an authorized data recipient access to the data owner's encrypted electronic information saved on the non-volatile secondary memory device;

(G) retrieving the data owner's encrypted private key from the data owner keychain, decrypting the data owner's encrypted private key using data owner's passcode, and saving data owner's decrypted private key only on the volatile memory device;

(H) encrypting the data owner's private key using the authorized data recipient's public key and saving the data owner's encrypted private key in an authorized data recipient keychain for the authorized data recipient on the non-volatile secondary memory device;

(I) receiving on the network server a request from a device or application operated or controlled by the authorized data recipient to access the data owner's encrypted electronic information saved on the non-volatile secondary memory device;

(J) retrieving the authorized data recipient's encrypted private key from the authorized data recipient keychain on the non-volatile secondary memory device, decrypting the authorized data recipient's private key using the authorized data recipient's passcode, and saving the authorized data recipient's decrypted private key only on the volatile memory device;

(K) decrypting the data owner's encrypted private key using the authorized data recipient's decrypted private key and saving the data owner's decrypted private key only on the volatile memory device;

(L) retrieving the data owner's encrypted electronic information from the non-volatile secondary memory device;

(M) decrypting the data owner's encrypted electronic information using the data owner's decrypted private key to produce on the volatile memory device a copy of the data owner's electronic information; and (N) transmitting the copy of the data owner's electronic information from the volatile memory device on the network server to the device or application operated or controlled by the authorized data recipient.

In a another implementation of the present invention, there is provided a network server for storing and sharing encrypted electronic information, the network server comprising:

(A) a microprocessor;

(B) a network interface for communicating with a device or application operated or controlled by a data owner and a device or application operated or controlled by an authorized data recipient's device over a data communications network, (C) a volatile memory device;

(D) a non-volatile secondary memory device;

(E) a user credential manager on the volatile memory device comprising program instructions that, when executed by the microprocessor, will cause the microprocessor to
1) receive via the network interface a data owner's passcode, an authorized data recipient's passcode, a data owner's public key, a data owner's private key, an authorized data recipient's public key and an authorized data recipient's private key,
2) store the data owner's passcode, the data owner's private key, the authorized data recipient's passcode and the authorized data recipient's private key only on the volatile memory device,
3) encrypt the data owner's private key using the data owner's passcode and save the data owner's encrypted private key in a data owner keychain for the data owner on the non-volatile secondary memory device,
4) encrypt the authorized data recipient's private key using the authorized data recipient's passcode and save the authorized data recipient's encrypted private key in an authorized data recipient keychain for the authorized data recipient on the non-volatile secondary memory device;

(F) a session manager on the volatile memory device, the session manager comprising program instructions that, when executed by the microprocessor, will cause the microprocessor to upload electronic information of the data owner to the network server and store the data owner's electronic information only on the volatile memory device;

(G) a data encryption engine on the volatile memory device, the data encryption engine comprising program instructions that, when executed by the microprocessor, will cause the microprocessor to encrypt the data owner's electronic information using the data owner's public key, and store the data owner's encrypted electronic information on the non-volatile secondary memory device connected to the network server, (H) an authorization manager on the volatile memory device, the authorization manager comprising program instructions that, when executed by the microprocessor, will cause the microprocessor to
1) receive on the network server an authorization from a data owner to give the authorized data recipient access to the data owner's encrypted electronic information saved on the non-volatile secondary memory device
2) retrieve the data owner's encrypted private key from the data owner keychain on the non-volatile secondary memory device,
3) decrypt the data owner's encrypted private key using the data owner's passcode and store the data owner's decrypted private key only on the volatile memory device,
4) encrypt the data owner's private key using the authorized data recipient's public key and store the data owner's encrypted private key in an authorized data recipient keychain for the authorized data recipient on the non-volatile secondary memory device,
5) receive on the network server a request from a device or application operated or controlled by the authorized data recipient to access the data owner's encrypted electronic information stored on the non-volatile secondary memory device,
6) retrieve the authorized data recipient's encrypted private key from the authorized data recipient keychain on non-volatile secondary memory device,
7) decrypt the authorized data recipient's private key using the authorized data recipient's passcode and store the authorized data recipient's decrypted private key only on the volatile memory device,
8) decrypt the data owner's encrypted private key using the authorized data recipient's decrypted private key and store the data owner's decrypted private key only on the volatile memory device; and (I) a data decryption engine in the volatile memory device, the data decryption engine comprising program instructions that, when executed by the microprocessor, will cause the microprocessor to decrypt the data owner's encrypted electronic information using the authorized data recipient's decrypted private key to produce on the volatile memory device a copy of the data owner's electronic information;

(J) wherein the session manager further comprises program instructions that, when executed by the microprocessor, will cause the microprocessor to transmit the copy of the data owner's electronic information from the volatile memory device to the device or application operated by the authorized data recipient.

The credential manager, authorization manager and session manager are configured to cooperatively create, manipulate and control (1) the data structures comprising the user keychains and system keychain on the non-volatile secondary memory device, and (2) the session records on the non-volatile memory device, as herein described and claimed, so that their combined operations will permit data owners to grant and revoke access to other users without sharing their private keys or passwords with those other users, and so that: (A) all unencrypted private keys, passcodes and electronic information received by the system and temporarily stored on the volatile memory device during a user's online session are immediately deleted as soon as the user's online session ends, and (B) no private keys, passcodes or electronic information of any user is ever stored on any non-volatile secondary memory device in unencrypted form. As such, a KDMA arranged and configured to operate in accordance with embodiments of the present invention provides a specific solution to problems that arise in the realm of computer systems configured to receive, store and manage encrypted electronic information, and enables computer functionality that has heretofore been impossible to achieve using conventional computer systems and conventional storage and encryption techniques.

BRIEF DESCRIPTION OF THE DRAWINGS

The accompanying drawings, which are incorporated into and constitute part of the specification, illustrate preferred embodiments of the invention, and, together with the description, serve to explain the principles of the present invention.

FIG. 2 is a high-level schematic diagram showing one example of a key and data management apparatus arranged and configured to operate, in accordance with one embodiment of the present invention, to receive, encrypt and store in encrypted form sensitive electronic information uploaded by a data owner.

FIG. 3 is a high-level schematic diagram showing the key and data management apparatus arranged and configured to operate, in accordance with one embodiment of the present invention, to retrieve, decrypt and transmit to the data owner sensitive electronic information previously uploaded to and stored on the system by the data owner.

DETAILED DESCRIPTION OF EXEMPLARY EMBODIMENTS

Figure 1A:
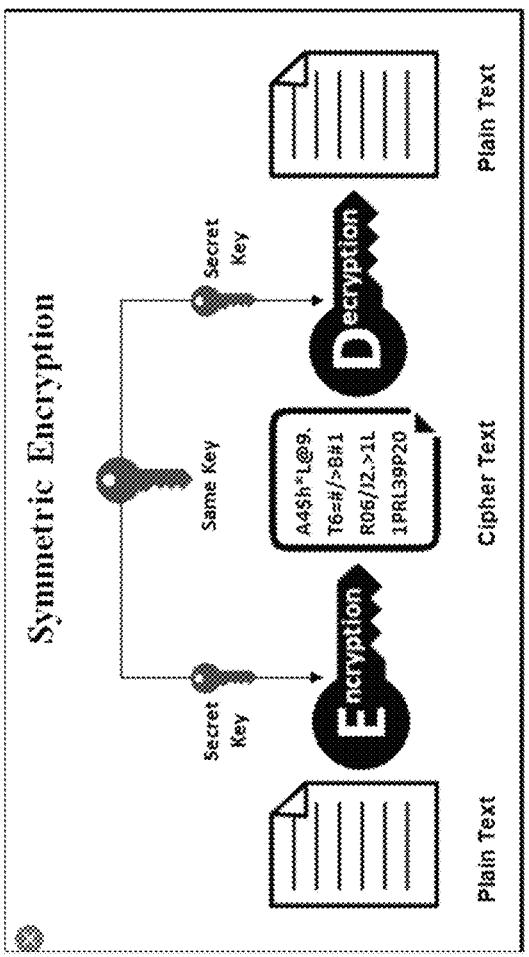
FIGS. 1A and 1B are high-level schematic diagrams illustrating the basic principles of symmetric and asymmetric encryption and some of the key differences between them.

Examples of embodiments of the present invention will now be described in some detail. Notably, the exemplary embodiments described below and shown in the drawings are not meant to limit the scope of the present invention or its embodiments or equivalents. In the following description, numerous specific details are set forth in order to provide a thorough understanding of the present invention. Particular example embodiments of the present invention may be implemented without some or all of these specific details. In other instances, process operations well known to persons of skill in the art have not been described in detail in order not to unnecessarily obscure aspects of the present invention. Before turning the figures, a high-level overview of the invention will now be provided.

In one embodiment, the present invention provides an encryption key and data management apparatus (KDMA), which utilizes a data vault to receive and store encrypted electronic information uploaded (or allowed to be uploaded) by the owners of the electronic information (i.e., the data owners). The encrypted information stored in the data vault is encrypted using a public key assigned to the data owner. Therefore, the encrypted electronic information of the data owner stored in the data vault can only be decrypted using the private key of the data owner. Upon receiving and verifying a valid username and password entered into the KDMA by the data owner, the KDMA may be instructed by the data owner to automatically retrieve the data owner's encrypted electronic information (or a portion of the data owner's encrypted electronic information) from the data vault, decrypt the encrypted electronic information using the private key assigned to the data owner to produce a copy of the data owner's electronic information (in unencrypted, clear text form), and then transmit the copy of the electronic information to a computer system, a display device or a different server that is operated or controlled, either directly or indirectly, by the data owner.

In some cases, the computer system being operated or controlled by the data owner when the data owner uploads his or her electronic information to the KDMA, or requests and receives the copy of the data owner's electronic information from the KDMA, will have on it its own encryption and decryption programs, as well as a copy of the data owner's public/private key pair. In these situations, the computer system operated by the data owner will itself be capable of encrypting the data owner's electronic information with the data owner's public key before uploading it to the KDMA, and will also be capable of decrypting the copy of the electronic information transmitted from the KDMA using the data owner's private key. Accordingly, under these circumstances, the KDMA may also be configured to upload the data owner's electronic information in encrypted form and save it to the encrypted data vault (without having to first encrypt it on the KDMA). And the KDMA may also be configured, under these circumstances, to transmit the encrypted electronic information to the computer system operated by the data owner (without having to first decrypt it).

Notably, the private keys for all data owners registered to use the KDMA are also encrypted. These encrypted private keys are stored in "keychains" on a persistent memory device, referred to as the key vault, which is located on or communicatively connected to the KDMA. The key vault has a keychain for every registered user on the KDMA, including every data owner and every authorized data recipient. Each keychain for each data owner contains an unencrypted copy of the data owner's public key, an encrypted copy of the data owner's private key, and encrypted copies of the private keys for every user on the KDMA that has been granted permission by the data owner to decrypt the data owner's encrypted electronic information.

When a user registers and establishes an account on the KDMA, the KDMA receives from the user a user ID (such as a username or email address) and a passcode selected by the user. The KDMA may also be configured to receive from the user the user's public key and the user's private key (a key pair). If the user does not own a public/private key pair, then the KDMA may be configured to generate and assign a key pair to the user. The passcode selected by the user can be in the form of a password, consisting of a string of upper- and lower-case letters, numbers, and special characters. The passcode also could be based on the biometrics of the user in the form of a registered fingerprint or fingerprints, retinal scans, or facial recognition.

If the user wants to upload and store any electronic information on the KDMA, the KDMA uses the user's private key to encrypt the user's electronic information, and then stores the encrypted electronic information in the encrypted data vault. Next, using the user's passcode, the KDMA encrypts the user's private key using any known encryption algorithm (such as symmetric encryption with salt method) and adds the encrypted private key to the user's keychain in the key vault. The KDMA also encrypts the user's selected passcode and stores the encrypted passcode in the user's keychain in the key vault. The user's passcode may be encrypted using any suitable algorithm, such as a cryptographic hash function (CHF) with a salt, for example. A salt is random data that is used as an additional input to a one-way function that hashes data, a password or passphrase. Salts are used to safeguard passwords in storage. Using the salt adds an additional safeguard to protect a user's password against being read from the system. In embodiments of the present invention, a new salt is randomly generated for each passcode entered by a user. The KDMA also stores the unencrypted public key of the user in the key vault.

Because the user's passcode and the user's private key are stored in the key vault in encrypted form, any authorized access to the key vault by the owner, operator or administrator of the KDMA, and any unauthorized access to the key vault (or theft of all or part of the data stored in the key vault) by any bad actors, such as a hacker, will only achieve access to encrypted data, which cannot be decrypted in the absence of an unencrypted copy of one or more private keys in the key vault. Therefore, such authorized or unauthorized access cannot give anyone access to the unencrypted passcodes or unencrypted private keys of any registered user on the KDMA. In addition, such authorized or unauthorized access to the encrypted private keys in the key vault can never give anyone unauthorized access to the encrypted electronic information stored in the encrypted data vault. Thus, even if all of the electronic information stored in the data vault is stolen, all of that information will remain encrypted and completely undecipherable.

If a user subsequently wants to have access to his or her encrypted electronic information stored in the data vault, the KDMA first requires that the data owner enter a valid user ID and passcode. The KDMA verifies the user ID and passcode, and then retrieves the data owner's encrypted passcode from the key vault and uses it to decrypt the data owner's private key, which would in turn be used to decrypt any or all of the data owner's encrypted information.

If a user owns encrypted electronic information stored in the encrypted data vault, and decides, as the data owner, to share some or all of the encrypted electronic information with another user (i.e., a designated authorized data recipient), the KDMA facilitates the sharing of the requisite private key for the data owner with the authorized data recipient. The authorized data recipient might be a person, an organization, another computer system or a computer application. The KDMA accomplishes this by carrying out the following steps.

First, the KDMA allows the authorized data recipient to register as a user on the system. Then, based on the authorized data recipient's preference, the KDMA issues or accepts a public and private key pair and a passcode from the authorized data recipient. Next, the KDMA then uses the authorized data recipient's private key to encrypt the authorized data recipient's passcode. Next, the KDMA uses the authorized data recipient's passcode to encrypt the authorized data recipient's private key and stores the authorized data recipient's encrypted private key, the authorized data recipient's encrypted passcode, and the authorized data recipient's unencrypted public key in the authorized data recipient's keychain in the key vault.

Upon selection of the authorized data recipient by the data owner for information sharing, the KDMA uses the data owner's passcode to decrypt the data owner's private key, and uses the public key for the authorized data recipient to encrypt the data owner's private key. The KDMA then stores the data owner's encrypted private key in the keychain for the authorized data recipient in the key vault. When the authorized data recipient logs into the system, the KDMA authenticates the authorized data recipient's passcode, uses the passcode to decrypt the private key for the authorized data recipient, and uses the decrypted private key of the authorized data recipient to decrypt the private key for the data owner who wants to share her electronic information with the authorized data recipient. After this is done, the KDMA re-encrypts the data owner's private key using the authorized data recipient's passcode (utilizing asymmetric encryption with salt method, for example) and adds the encrypted data owner's private key to the keychain for the authorized data recipient in the key vault.

When the authorized data recipient acknowledges or accepts the authorization from the data owner to access the data owner's encrypted electronic information in the data vault, the KDMA records the acceptance of authorization by the authorized data recipient by creating a token and adding the token to the keychain of the authorizing data owner in the key vault. This token contains the user ID for the authorized data recipient, and a date record for the authorization date, acceptance date for the authorization, a type for the authorization (specific type for access only to specific portions of the electronic information, or implicit type for full access to all of the electronic information owned by the data owner) and, whether or not the authorization has been rescinded. Each token can have multiple dates for authorization, acceptance, and deauthorization.

Typically, when the authorized data recipient accesses the data owner's encrypted information in the encrypted data vault, the KDMA retrieves the data owner's encrypted private key from the authorized data recipient's keychain in the key vault and uses the authorized data recipient's passcode to decrypt the data owner's private key. Then the KDMA uses the data owner's decrypted private key to decrypt the electronic information of the authorized data recipient. The data owner's keychain is also updated to reflect the deauthorization date.

If the KDMA receives an instruction from a computer system operated by the data owner indicating that the data owner wishes to stop sharing electronic info with any authorized data recipient, the KDMA removes the data owner's encrypted private key from the authorized data recipient's keychain in the key vault, rendering the data owner's encrypted information inaccessible to the authorized data recipient.

The logic described herein for the KDMA may be implemented in any central server using any of the conventional programming languages. The interaction with the KDMA can be accomplished using a standard Application Programming Interface (API). Preferably, all communication with the KDMA is in encrypted form using established standards for API communication and authentication, so that all communication between the KDMA and other computing devices operated by the data owner and/or the authorized data recipient is conducted using the Secure Socket Layer (SSL) protocol, as is known in the art, to ensure that data is encrypted while in transit. The key vault can be implemented in any available database platform and preferably is configured to automatically encrypt all the data stored within its tables. This ensures another layer of protection as any unauthorized access to the key vault will not divulge any of the private keys stored within the database. Even if this level of encryption was breached, since all the private keys are encrypted using the passcodes only known (passwords) or only capable of being entered by the data owners (biometric data) of private keys, bad actors cannot gain access to unencrypted private keys stored in the key vault.

The components of the KDMA are configured to operate such that the decrypted private keys can exist only in transient memory (session variables) for the duration of any user's interaction with the KDMA. In other words, when a user's session is terminated, such termination necessarily deletes the decrypted private key from the transient memory. Moreover, the decrypted private keys are never stored in unencrypted form in any database or file in any persistent memory storage device connected to or associated with the KDMA. This will ensure there is no possibility for the private keys to be accidentally revealed or purposely obtained by bad actors.

Moreover, with this design, even the owners, operators and administrators of the server computer upon which the KDMA is running cannot access the private keys because they are only stored in permanent storage in encrypted form and therefore require the actual passcode of the owners to be decipherable. And because private keys are only stored in unencrypted form as transient variables during active user sessions of data owners or their trusted authorized data recipients, the owners, operators and administrators of the KDMA can never gain access to the private keys in unencrypted form. For the same reasons, a trusted authorized data recipient will never be able to view and record the unencrypted private key for any data owner on the KDMA who has granted access to the authorized data recipient.

Figure 1B:
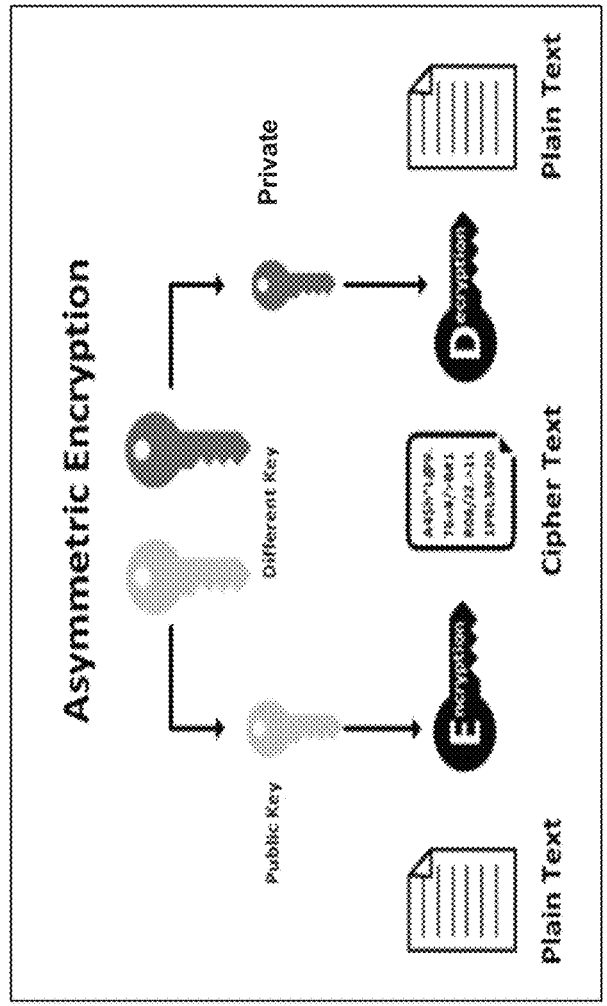

Turning now to the figures, FIGS. 1A and 1B are high-level schematic diagrams illustrating the basic principles of symmetric and asymmetric encryption and some of the key differences between them. As will be described in more detail below, embodiments of the present invention may be configured to encrypt electronic information using either one of these two techniques, or both of them, to protect sensitive electronic information for a user.

FIG. 2 is a high-level schematic diagram showing one example of a KDMA 230 arranged and configured to operate, in accordance with one embodiment of the present invention, to receive, encrypt and store in encrypted form sensitive electronic information uploaded from one or more data owner's devices 205 operated by the data owner (the data owner is not shown in FIG. 2). As illustrated in FIG. 2, the data owner's devices 205 can include any number of a variety of different consumer- or business-oriented devices capable of being connected to a computer network for the purpose of uploading electronic information collected by the device, including without limitation, a smartphone, personal computer, automobile vehicle, wearable step/running tracker, smart thermostat, video doorbell/security system, refrigerator, garage door opener, exercise equipment, smart TV, streaming device or digital camera. Some or all of the data owner's devices 205 may also be configured to download electronic information from the computer network.

As is typical, these smart devices may be designed and configured to collect and/or generate information about the data owner and/or the operational status of the device, and then transmit that information over an available data communications link to the KDMA 230, where that electronic info may be encrypted and/or stored in an encrypted data vault 292 connected to or associated with the KDMA 230. Usually, the data owner's devices 205 are configured to communicate with the KDMA 230 via a modem/router 210, which connects the data owner's local area network to a wide area network, such as the Internet. Suitably, the KDMA 230 may also be connected to the Internet. The modem/router 210 is typically configured to use a secure connection 215, such as a virtual private network (VPN) connection or a secure sockets layer (SSL) connection, which automatically encrypts electronic information as it is in transit between the data owner's devices 205 and the KDMA 230. It is noted that one or more of the data owner's devices 205, such as the smartphone, may instead use a cellular radio connection (with encrypted transmission technology) to connect to the wide area network or Internet, instead of the modem/router 210.

In the exemplary embodiment of the KDMA 230 shown in FIG. 2, the KDMA 230 comprises four subsystems, a key vault 285 and an encrypted data vault 292. The four subsystems include a registration subsystem 235, an authorization subsystem 245, a cryptographic subsystem 253 and a session manager subsystem 270. The KDMA 230 also comprises certain standard hardware components, such as a data bus, a network interface/adapter and a microprocessor, typically required for the KDMA 230 to process programming instructions and communicate with other computer systems.

As will be described in greater detail below, the registration subsystem 235 includes a credential manager 240, comprising a program or program module having programming instructions that, when executed by the microprocessor, will cause the microprocessor to carry out the functions of registering new users, permitting registered users to sign on, and allowing registered users to change their passwords. These functions are carried out by the credential manager 240 in accordance with the algorithm illustrated by the flow diagram in FIG. 7, which is described in more detail below.

The authorization subsystem 245 includes an authorization manager 250, which is a program or program module having program instructions that, when executed by the microprocessor on the KDMA 230, will permit a registered user of the KDMA 230 to request or acknowledge authorization to access a data owner's encrypted electronic information, or permit a data owner to grant or rescind authorization for another registered user to access the data owner's encrypted information. The cryptography subsystem 253 of the KDMA 230 includes programs or program modules having program instructions configured to cause the microprocessor to execute the steps of one or more encryption and decryption algorithms in order to encrypt and decrypt electronic information, encryption keys and passcodes, as required by the preferred operation of the KDMA 230 to protect the encrypted electronic information, keys and passcodes from being seen or used by unauthorized actors. The session manager subsystem 270 manages session tokens 275, user IDs and public keys 280 during online user sessions to control access to transient (volatile) memory and supply the cryptography subsystem with unencrypted passcodes and private keys necessary for carrying out the encryption and decryption of electronic information stored in the encrypted data vault 292.

The key vault 285 is essentially a database located on a memory storage device on the KDMA 230 where user keychains 287 and the system keychain 290 are stored. The user keychains 287 comprises a plurality of database tables, each table containing records that define and track registered user credentials (e.g., passcodes, public keys and private keys), and records that define and track which users have been granted authority to access the unencrypted electronic information of other registered users.

When a data owner operates one of the data owner's devices 205 to log into the KDMA 230, the session manager subsystem 270 generates a unique session token for the data owner's session. The unique session token will be used as a pointer to the place in transient memory where transient variables (such as unencrypted passcodes and private keys) will temporarily reside while the data owner remains logged into the KDMA 230. One of the tasks that the data owner can perform is to upload his or her electronic data to the KDMA 230. Typically, but not always, the electronic information of the data owner may exist in the data owner's devices 205 as clear text electronic info 220, although the communication channel may be somewhat protected by virtue of the secure connection 215 used to transmit the clear text electronic info 220 to the KDMA 230. When the clear text electronic info 220 arrives at the KDMA 230, the programs and programming modules comprising the cryptography subsystem 253 and the session manager subsystem 270 are activated to use the unique session token and the data owner's user ID (provided by the data owner when the data owner logged into the KDMA 230) to retrieve the data owner's public key from the key vault 285 and use the public key to encrypt the clear text electronic info 220 in order to generate an encrypted version (encrypted electronic info 295 in FIG. 2) of the electronic info and store it in the encrypted data vault 292.

FIG. 3 is a high-level schematic diagram showing the KDMA 230 arranged and configured to operate, in accordance with one embodiment of the present invention, to retrieve, decrypt and transmit to the data owner sensitive electronic information previously uploaded to and stored on the KDMA 230 by the data owner. As illustrated by FIG. 3, when the data owner operates one or more of the data owner's devices 205 to submit to the KDMA 230 an instruction to retrieve and deliver to the data owner's devices 205 some portion of the data owner's encrypted electronic information 295 stored in the encrypted data vault 292, the cryptography subsystem 253, operating in conjunction with the session manager subsystem 270 retrieves the encrypted electronic info 295 from the encrypted data vault 292 and moves it into the transient (volatile) memory of the KDMA 230. Using the user ID supplied by the data owner at log in, the session manager subsystem retrieves from the credentials table 288 of the key vault 287 a copy of the encrypted private key for the data owner. The cryptography subsystem 253, and more specifically, the data decryption engine of the cryptography subsystem 253, uses the passcode to decrypt the encrypted private key of the data owner, and then uses the decrypted private key to decrypt the encrypted electronic information 295 retrieved from the encrypted data vault 292. The unencrypted electronic information 220 is then transmitted over the secure connection 215 to the data owner's devices 205 via the modem/router 210.

Figure 4:
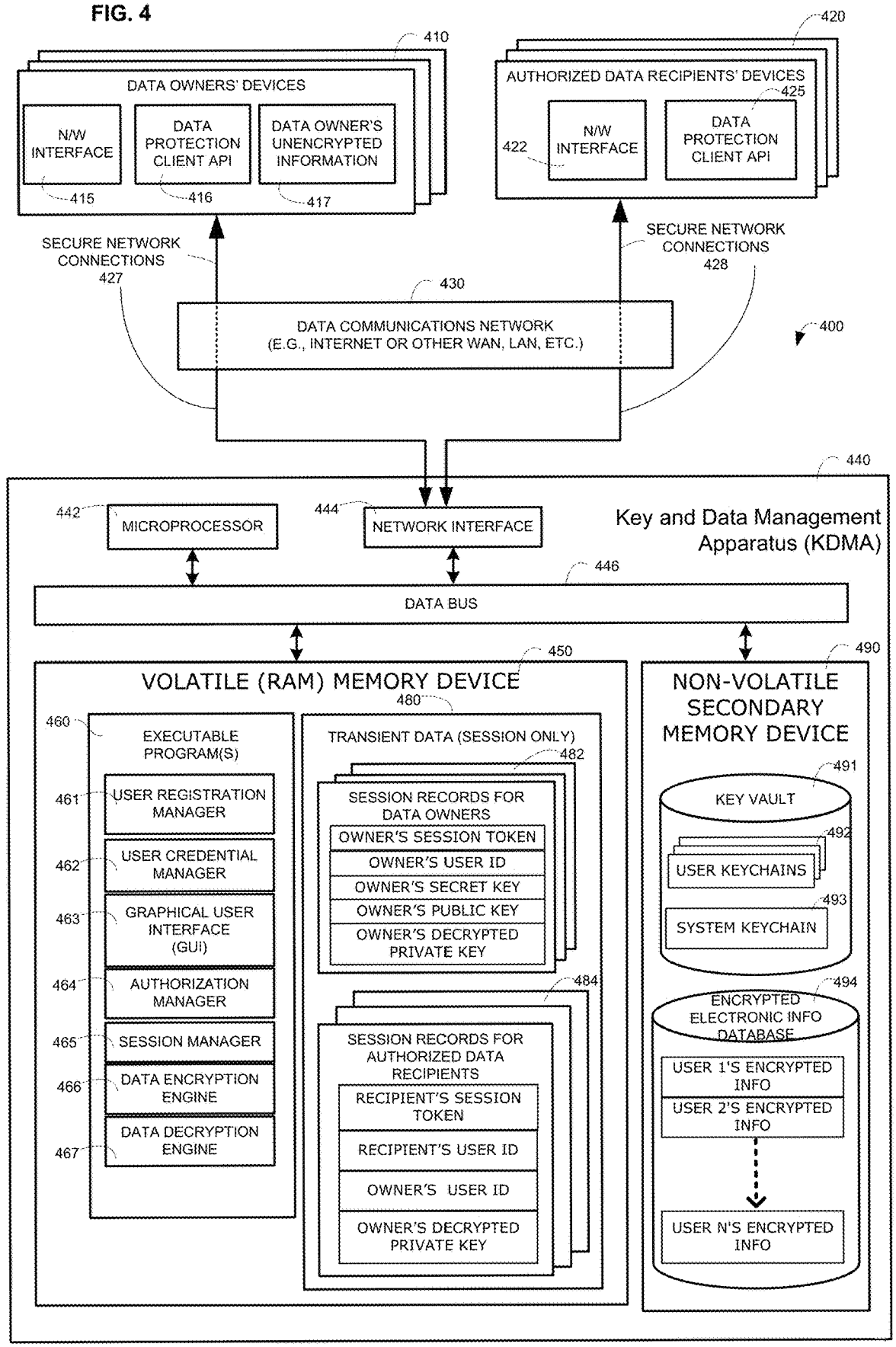
FIG. 4 shows a high-level block diagram illustrating, by way of example, the primary physical and logical components of a computer network that includes a KDMA arranged and configured to operate in accordance with one embodiment of the present invention.

FIG. 4 shows a block diagram illustrating, in more detail, the primary physical and logical components of an example of a computer network 400 that includes a KDMA 440 arranged and configured to operate in accordance with one embodiment of the present invention. As shown in FIG. 4, the computer network 400 comprises a plurality of data owners' devices 410, a plurality of authorized data recipients' devices 420, a data communications network 430, such as the Internet, and the KDMA 440. The plurality of data owners' devices 410 and authorized data recipient devices 420, which will be operated by data owners and authorized data recipients, respectively, are communicatively connected the KDMA 440 over the data communications network 430 via secured network connections 427 and 428. A network interface 444, such as a network adapter card, attached to the KDMA 440, permits the KDMA 440 to communicate with the data communications network 430.

In the example computer network 400 of FIG. 4, the data owners' devices 410 may comprise, for example, a personal computer, a smartphone, a purchased or leased vehicle, a smart TV, a streaming device, an exercise bike or treadmill, a smart thermostat, a smart kitchen appliance, a voice-commanded personal digital assistant device (such as an Amazon Echo), or any other cloud-connected electronic device owned and operated by the data owner, which is capable of gathering and storing electronic information about a data owner's activities and documents, or about the device's location, condition, operational status, performance, etc., and uploading such information to a central server, such as the KDMA 440. Such devices may sometimes referred to as "cloud-enabled" devices. Each data owner device 410 includes a memory storage area (such as a hard drive, for example) to store a local copy of the data owner's unencrypted data 417. Each data owner device 410 also includes a network interface 415 (such as a network adapter card or USB network adapter), which permits programs and applications running on the data owner's devices 410 to exchange commands, queries, requests, parameters and electronic information with the KDMA 440 via the secure network connections 427 and the data communications network 430.

The data owner's unencrypted electronic information 417 on the data owners' devices 410 may comprise unencrypted electronic information generated and/or collected by the data owners' devices 410. In the example shown in FIG. 4, is indicated as being unencrypted (plain text) information, which will be encrypted by the KDMA 440 using data owner's public key once it is delivered to the KDMA 440. However, it shall be understood that the data owner's electronic information 417 on the data owners' devices 410 may, in the alternative, be encrypted while it still resides on the data owners' devices 410 using the data owners' public keys prior to storage or transmission to the KDMA 440.

The authorized data recipients' devices 420 typically comprises a computer system or computer network operated by an authorized data recipient (not shown in FIG. 4), such as a device or vehicle manufacturer, insurance company, streaming company, Internet service provider, a healthcare organization, an application developer, a hotel operator, security company, or any other person or business that might have a legitimate interest in receiving, processing and/or using the data owners' electronic information. Each one of the authorized data recipients' devices 420 also includes a network interface 422, (such as a network adapter card), which permits programs and applications running on the authorized recipients' devices 420 to exchange commands, queries, requests, parameters and electronic information with the KDMA 440 via the secure network connections 428 and the data communications network 430.

Both the data owners' devices 410 and the authorized data recipients' devices 420 also include, respectively, a data protection client API's 416 and 425. APIs are application programming interfaces, which are software intermediaries that allow "client" programs and applications executing on the data owners' devices 410 and the authorized data recipients' devices 420 to exchange requests and commands to corresponding "server" programs and applications executing on the KDMA 440. API's usually comprise a collection of predetermined function calls and subroutines specifically designed for such program to program communication between a client device and a server, such as the KDMA 440. The data communications network 430 is any wired or wireless network with appropriate security, such as TLS (Transport Level Security) or VPN, to ensure security for the data during the transmission.

The KDMA 440 (Key and Data Management Apparatus) may comprise a physical server or a virtual server operating as part of a server farm on premises or in the cloud, which incorporates all the hardware and software components required for managing user IDs, passcodes, encryption keys, user authentications and deauthorizations, encryption, decryption, electronic information storage, and authorized dissemination of unencrypted electronic information.

As illustrated in FIG. 4, the KDMA 440 typically comprises a microprocessor 442, a network interface 444, a data bus 446, a volatile (random access) memory device 450, and a secondary (persistent) memory device 490. The microprocessor 442 is the main processor unit for executing programming instructions to carry out the logic of embodiments of the present invention as herein described. The microprocessor 442 may comprise a single microprocessor or multiple processors, which may be located in a physical or a virtual server. The volatile memory device 450 is used to store and execute a collection of programs 460 that are executable on the microprocessor 442. Each program in the collection of programs 460 includes programming instructions that, when executed by the microprocessor 442, will cause the microprocessor 442 to carry out the logic required for accomplishing the functions and capabilities herein described for the KDMA 440, and illustrated in the flow diagrams of FIGS. 7 through 12.

The volatile memory device 450 is also used to store transient data 480 required by the collection of programs 460 while they are being executed by the microprocessor 442. The executable programs 460 are loaded into volatile memory 450 from an associated non-volatile memory storage device (not shown in FIG. 4 for brevity) upon the startup of the KDMA 440 and remain in volatile memory 460 until the KDMA 440 is powered down. Transient data 480 is the data loaded and manipulated by the executable programs 460 for the duration of their execution. By design, transient data 480 can only be accessed by the executable programs 460 that create and use the transient data 480. Transient data 480 is always deleted from the volatile memory device 450 whenever the executable programs 460 that requires the transient data 480 terminate. The data bus 446 provides the physical communication link (or conduit) between the microprocessor 442, the volatile memory device 450 and the secondary memory device 490, which enables the microprocessor 442 to perform arithmetic operations on the data stored in the memory devices 450 and 490 in accordance with and under the control of programming instructions in the collection of executable programs 460.

The collection of executable programs 460 includes a user registration manager 461, a user credential manager 462, a graphical user interface 463, an authorization manager 464, a session manager 465, a data encryption engine 466 and a data decryption engine 467. Although illustrated in FIG. 4 as a collection of distinct programs, it will be understood by skilled artisans that, in some embodiments of the present invention, some or all of the functions of these programs may instead be incorporated into a single program, or a larger number of programs, each comprising an ordered collection of function and/or subroutines calls.

The secondary memory device 490 may comprise one or more persistent (i.e., non-volatile) storage devices, such as hard drives or solid state drives. Secondary memory device 490 may also comprise removable storage media, such as USB flash drives, CDs, and DVDs. Because the secondary memory device 490 is non-volatile, it retains its data with or without electrical power. Notably, for purposes of implementing embodiments of the present invention, the physical components of the secondary memory device 490 may be located on widely distributed computer systems or computer networks, or it may be centralized so that it may be located in the same physical box as the rest of the components of the KDMA 440, as shown in FIG. 4. The system may also be configured to use multiple secondary memory devices, which may be spread across a multiplicity of physical computers or computer networks.

Figure 5:
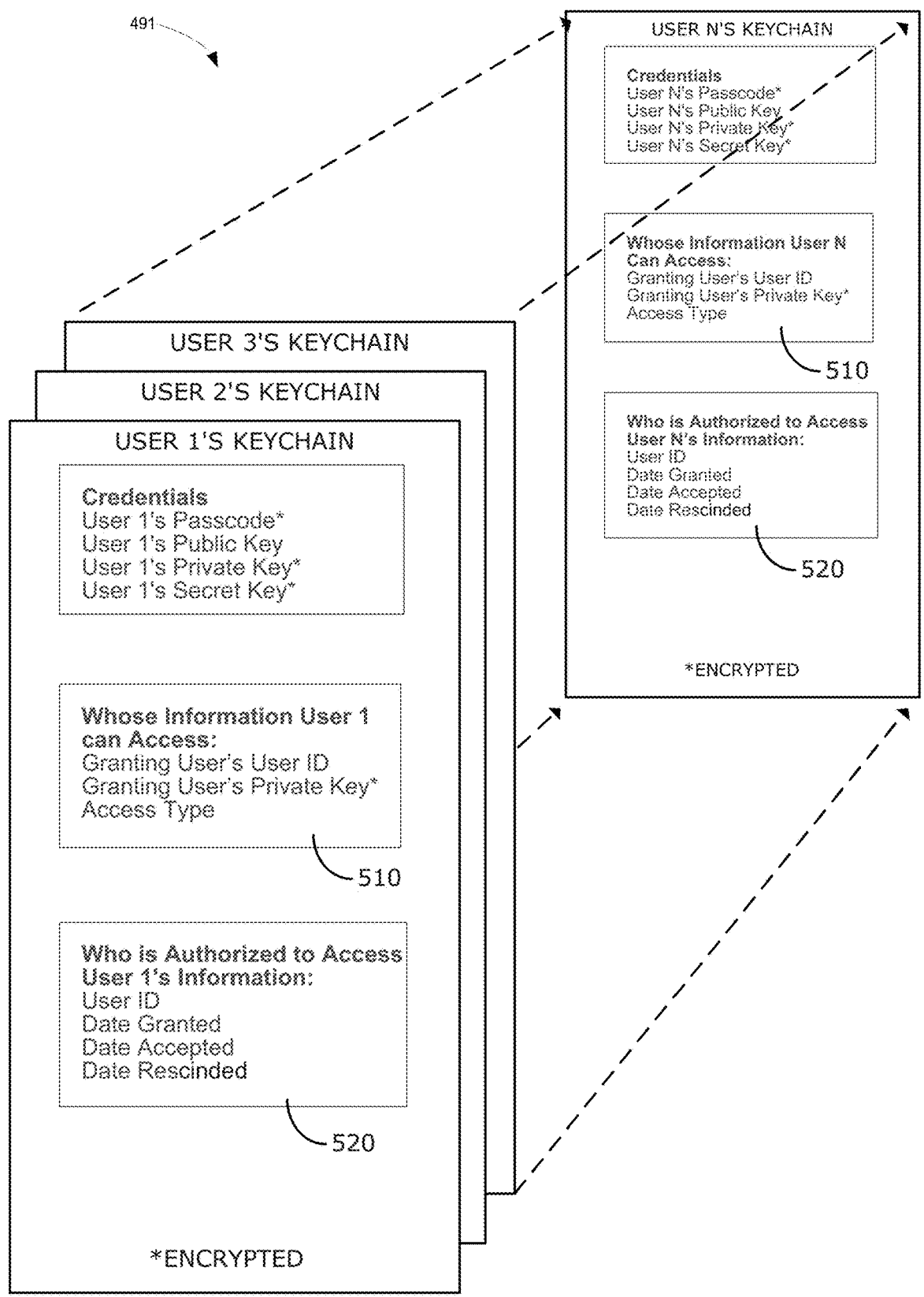
FIG. 5 shows a high-level schematic diagram illustrating, by way of example, the primary logical components of user keychains created and stored in the key vault in accordance with some embodiments of the present invention.

In embodiments of the present invention, the secondary memory device 490 stores a key vault 491. The key vault 491 that contains all of the users' keychains 492. A keychain comprises a collection of database objects and/or logical data structures, such as tables, records, fields and/or linked lists, suitably configured to receive, hold and track registered user credentials and authorization information. FIG. 5 shows a high-level schematic diagram illustrating, by way of example, the primary logical components of user keychains created and stored in the key vault 491 in accordance with some embodiments of the present invention.

Figure 6:
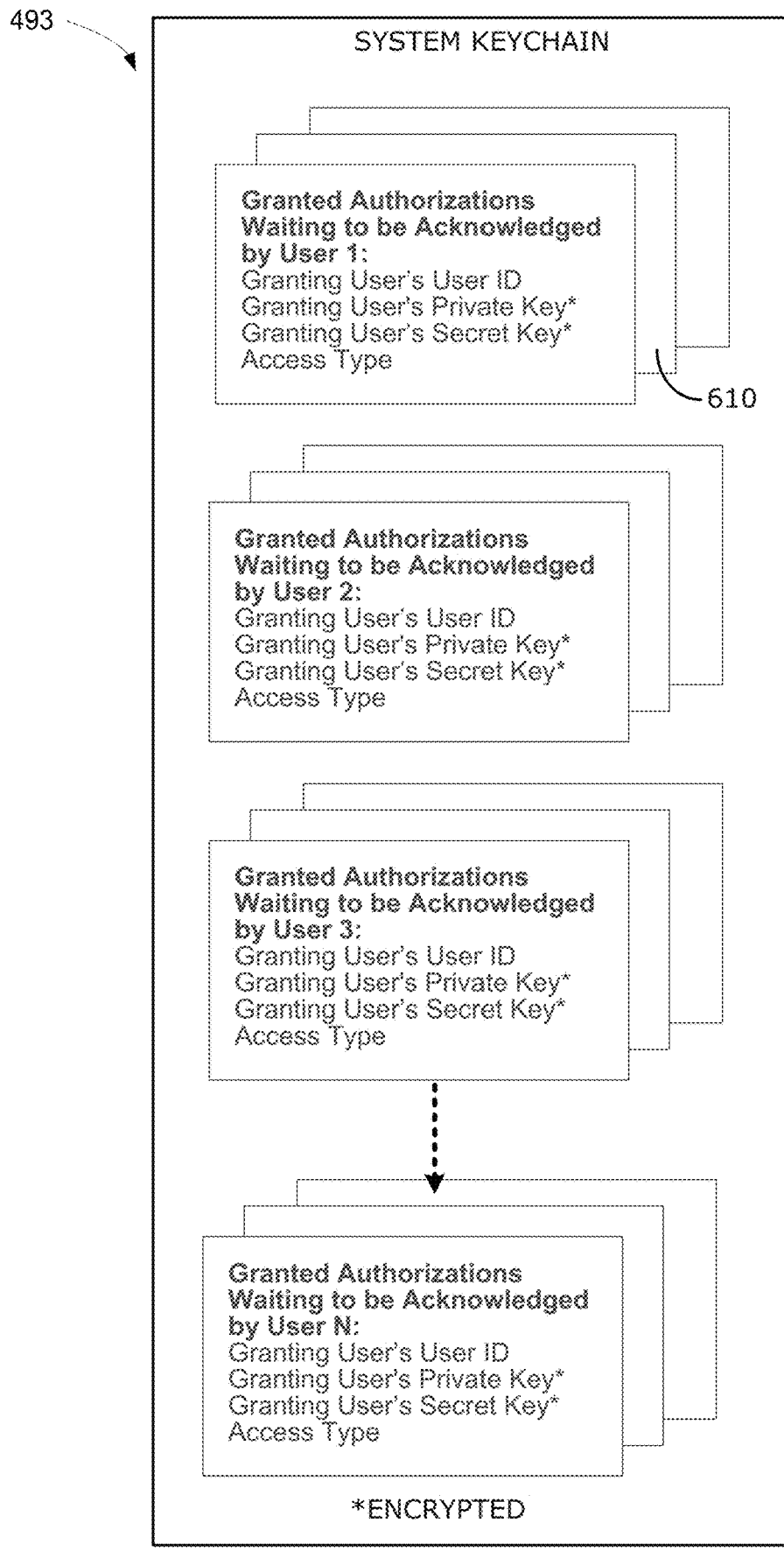
FIG. 6 shows a high-level schematic diagram illustrating, by way of example, the primary logical components of a system keychain created and stored in the key vault in accordance with some embodiments of the present invention.

The key vault 491 also stores a system keychain 493, which is essentially a database populated with database and/or logical data structures, such as tables, records, fields and/or linked lists, suitably configured to receive, hold and track previously granted authorizations that have yet to be acknowledged by the authorized data recipient, as explained in more detail below. FIG. 6 shows a high-level schematic diagram illustrating, by way of example, the primary logical components of the system keychain created and stored in the key vault 491 in accordance with some embodiments of the present invention.

The tables, records, fields and/or linked lists comprising the collection of user keychains 492 and the system keychain 493 in the key vault 491 may be located in a single database or multiple databases. The single or multiple databases may be located on the same physical server, or they may be distributed among a plurality of widely distributed computer systems or computer networks, without departing from the invention. or it may be centralized so that it may be located in the same physical box as the rest of the components of the KDMA 440, as shown in FIG. 4. The system may also be configured to use multiple key vaults, which may be centralized on one server, or alternatively, spread across a multiplicity of physical servers.

In addition to the key vault 491, the secondary memory device 490 also holds a an encrypted electronic information database 494, which is a database populated with database and/or data structures, such as tables, records, fields and/or linked lists, suitably configured to receive, hold and track electronic information previously uploaded by registered users. The electronic information stored in the encrypted electronic information database 494 may include any kind of electronic information, including without limitation, files, records, reports, facts, studies, statistics, databases, email messages, text, text messages, images, videos, movies, audio recordings, compilations, plans, programs, instructions, source code, object code, executable code, credentials, user IDs, usernames, passwords, passcodes, commercial sales data, financial data, healthcare data, cellphone location data, workout history data, online streaming data, telematics data, traffic data, social networking data, government data, personal data, and any other type of data a registered user chooses to upload to the KDMA 440 for safekeeping. Importantly, some or all of the authorized data recipients will also be data owners, and some or all of the data owners may also be authorized data recipients. Every data owner and every authorized data recipient must be registered as a user and have valid log on credentials to use the KDMA 440.

Returning now to the collection of executable programs 460 in the volatile memory device 450 during operation of the KDMA 440, the user registration manager 461 is a program or programming module, comprising executable programming instructions that, when executed by the microprocessor 442, will cause the microprocessor 442 to manage and control activations and deactivations of users' accounts on the KDMA 440. As such, the user registration manager 461 accepts a user's user ID and the user's selected passcode when the user operates one of the data owners' devices 410 or one of the authorized data recipients' devices 420 to log into the KDMA 440 for a first time. The user's user ID typically comprises a username, which must be unique (it cannot already be assigned to another user) and can be of any length or complexity based on the specific implementation of the invention. The user's passcode may comprise, for example, a password having a defined acceptable length and complexity, depending on the implementation. The passcode may also be based on a user's biometrics, depending on the implementation of the invention.

The user registration manager 461 will accept the user's preference for symmetric or asymmetric encryption of user's data. If symmetric encryption is selected, the user registration manager 461 may be configured to accept a user's existing secret key for encryption or auto-generate an encryption key for the user. Any of the existing methods for symmetric encryption can be used based on the user's selection of the method. For the public/private keypair, the user registration manager 461 may be configured to accept a user's existing public and private key pair for encryption, or can generate one for the user. All registered users will have a public/private key pair regardless of their selection of symmetric encryption as their preferred encryption method. If a user chooses to provide his or her own public/private keypair, then the user registration manager 461 will attempt to verify the validity of the key pair by encrypting and decrypting a known data value using the key pair and accept the keypair if the decrypted value matches the original data used for verification. The user-selected passcode would then be used to encrypt the user's secret key (if symmetric encryption was selected) or the user's private key (if asymmetric encryption was selected). The user's passcode may be encrypted using any suitable encryption algorithm, such as a cryptographic hash function (CHF) with a salt. Then the user registration manager 461 will store the user's user ID, hashed passcode and salt, selected encryption methodology, encrypted secret key and encryption technique for symmetric encryption (if selected), and encrypted private key and clear text public key (for asymmetric encryption) in the in the key vault 491.

The user credential manager 462 is a program or programming module comprising executable programming instructions that, when executed by the microprocessor 442, will cause the microprocessor 442 to manage and control user activities associated with user IDs and user passcodes. For example, when a user wishes to change his or her password (which may serve as one type of passcode), the user credential manager 462 will accept the old passcode and the new passcode for the user. The user credential manager 462 will then use a cryptographic hash function (CHF) to create the hashed version of the old passcode and compare the hashed value to the value stored in the users keychain in the key vault 491. If there is an exact match, then the user credential manager 462 will cause the microprocessor 442 to perform the following steps:

1—Use the old passcode to decrypt the secret key for a user who had selected symmetric encryption for their data and to decrypt the user's private key.

2—Use the new passcode to encrypt the secret key for the symmetric encryption (if the user has selected symmetric encryption) and the user's private key.

3—Use CHF to encrypt new passcode plus the existing salt on the user record.

4—Update the user's record in the credentials table in the key vault 491 with the new values for the passcode and the encrypted symmetric or asymmetric keys.

The graphical User Interface (GUI) 463 is a program or programming module comprising executable programming instructions that, when executed by the microprocessor 442, will cause the microprocessor 442 to display a collection of screens, scroll bars, windows, tabs, cursors, buttons and icons, and to monitor and control input devices and output devices, such as mice, keyboards, touchscreens and printers, connected to the data owners' devices 410 or the authorized data recipients' devices 420, to facilitate user interactions with the various components of the KDMA 440.

The authorization manager 464 is a program or programming module comprising executable programming instructions that, when executed by the microprocessor 442, will cause the microprocessor 442 to manage and process requests by data owners to allow authorized recipients to access to their electronic information and data stored in encrypted form in the encrypted electronic info database 494. When a data owner decides to allow any other registered user to have access to all or part of the data owner's encrypted electronic information, and have the ability to have the encrypted electronic information automatically decrypted and transmitted to the other registered user (the authorized data recipient), the data owner's instructions to grant such access will be carried out in the following manner by the microprocessor 442 operating under the control of the authorization manager 464:

1—Confirm that the user being authorized for access (the authorized data recipient) is a registered user on the KDMA 440.

2—Use the data owner's passcode to decrypt the data owner's secret key (if symmetric encryption is selected) or the data owner's private key (if asymmetric data encryption is selected).

3—Use the authorized data recipient's public key to either encrypt the data owner's secret key (for symmetric encryption) or to encrypt the data owner's private key (if asymmetric data encryption is selected).

4—Write the authorization record to the "Granted Authorizations Waiting to be Acknowledged" table (depicted in FIG. 6) for the authorized data recipient in the system keychain 493 in the key vault 491.

5—Record in the Access Type table in the system keychain 493 whether the approval is implicit (meaning access is granted for all of the data owner's electronic information) or explicit (meaning access is limited to specific records, record types or objects).

6—Record the authorization approval in the "Whose Information User N can Access" table in the authorized data recipient's keychain 491 in the key vault 490.

7—Transmit a notification to the device (or the email or cellphone) operated by the authorized data recipient to inform the authorized data recipient that the authorization has been granted.

8—Upon the authorized data recipient's logging into the KDMA 440 and acknowledging the authorization, the programming instructions in the authorization manager 464 will cause the microprocessor 442 to perform the following steps a-e:

a—Use the authorized data recipient's passcode to decrypt the data owner's secret key (if data owner has selected symmetric encryption for their data) or private key (if data owner has selected asymmetric encryption for their data), which was encrypted using the data owner's public key and stored in "Granted Authorizations Waiting to be Acknowledged" table in the system keychain 493 (shown in FIG. 6) during the data owner's authorization approval process.

b—Using the authorized data recipient's passcode, encrypt the secret key or private key (depending on encryption methodology selected by data owner for their data) for the data owner.

c—Store the encrypted secret key or the encrypted private key information and the implicit or explicit access type information in the "Whose Information user Has Access to" table 510 in the authorized data recipient's keychain 491 in the key vault 490 (shown in FIG. 5).

d—Update the acceptance of authorization by the authorized data recipient in the "Whose Information User can Access" table 510 (shown in FIG. 5) of the authorized data recipient's keychain 491 in the key vault 490.

e. Remove the authorization record from "Granted Authorizations Waiting to Be Acknowledged" table 610 in system keychain 493 (shown in FIG. 6) for the authorized data recipient in the key vault 490.

9—Upon a the data owner's revocation of authorization for any authorized data recipient, the microprocessor 442, operating under the programming instructions in the authorization manager 464, performs the following steps:

a—Remove the authorization record from "Whose Information User can Access" table 510 (shown in FIG. 5) of the authorized data recipient's keychain 491 in the key vault 490.

b—Update the "Date Rescinded" record in the "Who is Authorized to Access User's Information" table 520 (shown in FIG. 5) of the key vault 491 to record the revocation.

The session manager 465 is a program or programming module comprising executable programming instructions that, when executed by the microprocessor 442, will cause the microprocessor 442 to monitor and manage user login attempts, verify user credentials, and set up session records 482 and 484 on the volatile memory device 450, which define the access rights necessary for the KDMA 440 to automatically decrypt the user's own electronic information upon the user's demand, or to automatically decrypt the electronic information owned by other registered users who have authorized the user to access and decrypt their electronic information. The session records 482 and 484 store session tokens, unencrypted user IDs for data owners and authorized data recipients, and unencrypted secret and private keys for data owners and authorized data recipients, all of which are needed by the data encryption engine 466 and the data decryption engine 467. A session token, also known as a session ID, is an encrypted, unique string that identifies a specific session instance for a protected resource. If a session token to a protected resource, such as a location in transient memory, is known to one or more application programs, such as the data decryption engine 466 or the data protection client APIs 416 and 425, then the application programs can use the session token to access the protected resource (transient memory) and all user information contained in it. Thus, the session tokens in the session records 482 and 484 on the KDMA 440 act as pointers to the appropriate locations in the volatile memory 450 that remote programs, such as the data protection client APIs 416 and 425, can store and retrieve sensitive electronic data while communicating with the KDMA 440. The session records 482 and 484 are deleted when the user logs out of the KDMA 440.

Operating under the control of the program instructions in the session manager 465, the microprocessor 442 will carry out the following steps when users log into to KDMA 440:

1—Accept the user's username and passcode.

2—Use a cryptographic hash function (CHF) to verify that the username/passcode entered by the user is valid.

3—Using the verified passcode of the user, decrypt the secret key (for users who have selected symmetric encryption) or the private key (for users who have selected asymmetric encryption).

4—Generate a random unique session token for the user's session.

5—Store the user's session token, passcode, decrypted secret key or the public key/decrypted private key and the user ID as transient data 484 on the volatile memory device 450 to be accessed by the data encryption engine 466 or the data decryption engine 467.

6—Pass the session token to the user's session to be provided by programs executing on the user's device 410 when the user operates the user's device 410 to submit a request for access to electronic information, and that request requires encryption or decryption by the data encryption engine 466 or the data decryption engine 467, respectively, on the KDMA 440.

When an authorized data recipient attempts to access and decrypt encrypted electronic information owned by a data owner who has granted the authorized data recipient permission to access the information, the session manager 465 performs the following steps:

1—Accept the username for the data owner whose information will be accessed and store it as transient data on the volatile memory device 450.

2—Accept the authorized data recipient's session token and store it as transient data on the volatile memory device 450.

3—Retrieve the data owner's encrypted private key from the "Whose Information the User Has Access To" table in the authorized recipient's keychain in the key vault 490.

4—Using the authorized data recipient's session token, retrieve the authorized data recipient's passcode to decrypt the authorized data recipient's secret key or private key (depending on the authorized data recipient's method of data encryption).

5—Generate a session token for authorized data recipient data access and store the token and the authorized data recipient's username, decrypted secret key or private key on the volatile memory device 450.

6—Pass the session token to the authorized data recipient's session so that it can be provided to the encryption and decryption engines when requesting access to data.

When a user logs out or a session times out, the session manger 465 will remove the user information stored on the volatile memory device 450 and the session token will be rendered invalid.

The data encryption engine 466 is a program or programming module comprising executable programming instructions that, when executed by the microprocessor 442, will cause the microprocessor 442 to encrypt electronic information when requested by the data owner. The data can be delivered in encrypted form by the data owners' device(s) 410, or it can be delivered to the KDMA 440 in unencrypted form and be encrypted by the data encryption engine 466. The data encryption engine 466 causes the microprocessor to perform the encryption based on the session token that must be passed to the data encryption engine 466, along with the electronic information to be encrypted. When unencrypted data is delivered to the data encryption engine 466, it performs the following steps:

1—Using the session token, the data encryption engine 466 retrieves the username, unencrypted secret key or the public key (depending on the user's selected encryption method) for the data owner from the volatile memory device 450.

2—Using the secret key, or the public key, the data encryption engine 466 will encrypt the electronic information.

3—The encrypted electronic information will be stored on the secondary memory device 490.

The data decryption engine 467 is a program or programming module comprising executable programming instructions that, when executed by the microprocessor 442, will cause the microprocessor 442 to decrypt electronic information for data owners and authorized data recipients who are authorized by the data owners to access and decrypt their encrypted electronic information. The data decryption engine 467 requires a session token from one of the session records 482 and 484 to perform the decryption of the electronic information. When a program executing on a remote device operated by a data owner attempts to access the data owner's own encrypted electronic information, the program must pass a session token and the data owner's username to the data decryption engine 467, along with the information that identifies the specific electronic information the data owner is attempting to retrieve and decrypt. Upon receiving a username and session token, the microprocessor 442, operating under the control of the program instructions in the data decryption engine 467, performs the following steps:

1—Using the session token, retrieve the session information from the volatile memory device 450.

2—Verify that the username that was provided with the data owner's request for decryption matches the username stored on the volatile memory device 450 for the session token.

3—Use the secret key, or decrypted private key, for the session to retrieve and decrypt the requested encrypted electronic information.

4—Transmit the decrypted electronic information to the requesting program or device operated by the data owner.

When a program controlled by an authorized data recipient is attempting to access and decrypt encrypted electronic information belonging to a data owner who has granted permission for the authorized data recipient to see it, the data decryption engine 467 requires that the requesting program provide a session token, the authorized data recipient's username, the data owner's username, and information that identifies the specific portion of the encrypted electronic information the program is attempting to retrieve and decrypt. Upon receiving the session token and all the necessary information, the microprocessor 442, operating under the control of the program instructions of the data decryption engine 467, performs the following steps:

1—Using the session token, retrieve the session record for the authorized data recipient 484 from the transient data area 480 of the volatile memory device 450.

2—Match the user ID for the data owner and the user ID for the data requester against the session information for the session token in in the volatile memory device 450.

3—Use the identifying information about the electronic information requested by the authorized data recipient against the authorization list for the documents authorized by the data owner to be viewed by this authorized data recipient.

4—If authorized to be viewed, retrieve the encrypted electronic information from the secondary memory device 490.

5—Use the data owner's secret key, or decrypted private key, for the session to decrypt the requested electronic information.

6—Transmit the data owner's decrypted electronic information to the program or device operated by the authorized data recipient.

FIGS. 7 through 12 show flow diagrams illustrating various examples of additional or alternative algorithms that may be executed by the microprocessor 442, operating under the control of programming instructions in the executable programs 460, to update records in the volatile memory device 450 and the secondary memory device 490, as necessary, in response to instructions or requests received from programs and applications running on remote computer devices (such as remote servers, computers, Internet-enabled appliances, etc.). The instructions and requests, which may include, for example, requesting a new account, changing a password, granting permission for another user to access encrypted electronic information stored on the KDMA 440, requesting access to another user's encrypted information and/or revoking permission for another user to access encrypted information, are usually communicated to the KDMA 440 via an API running on both remote computing device and the KDMA 440. The API defines the kinds of calls or requests that can be transmitted to and processed by the collection of executable programs 460 on the KDMA 440, how to make them, the data formats that should be used, the conventions to follow, etc. The API can also provide extension mechanisms so that users can extend existing functionality in various ways and to varying degrees. The API can be entirely custom, specific to a component, or designed based on an industry-standard to ensure interoperability. Through information hiding, APIs enable modular programming, allowing users to use the interface independently of the implementation.

Figure 7:
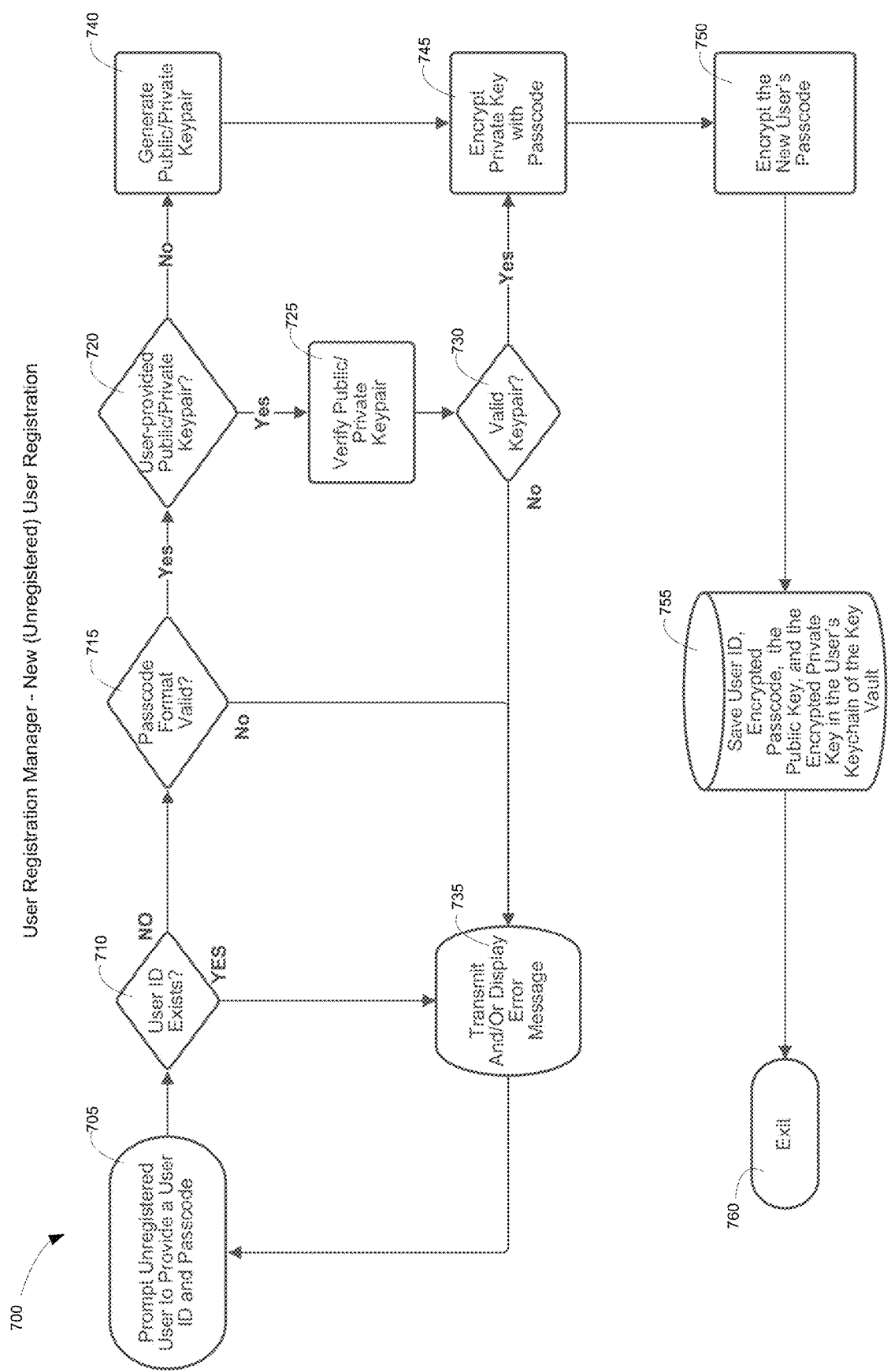
FIG. 7 shows a high-level flow diagram illustrating, by way of example, the steps of an algorithm executed by the microprocessor, operating under the control of the user registration manager, to establish an account for a new user in one embodiment of the present invention.
Figure 8:
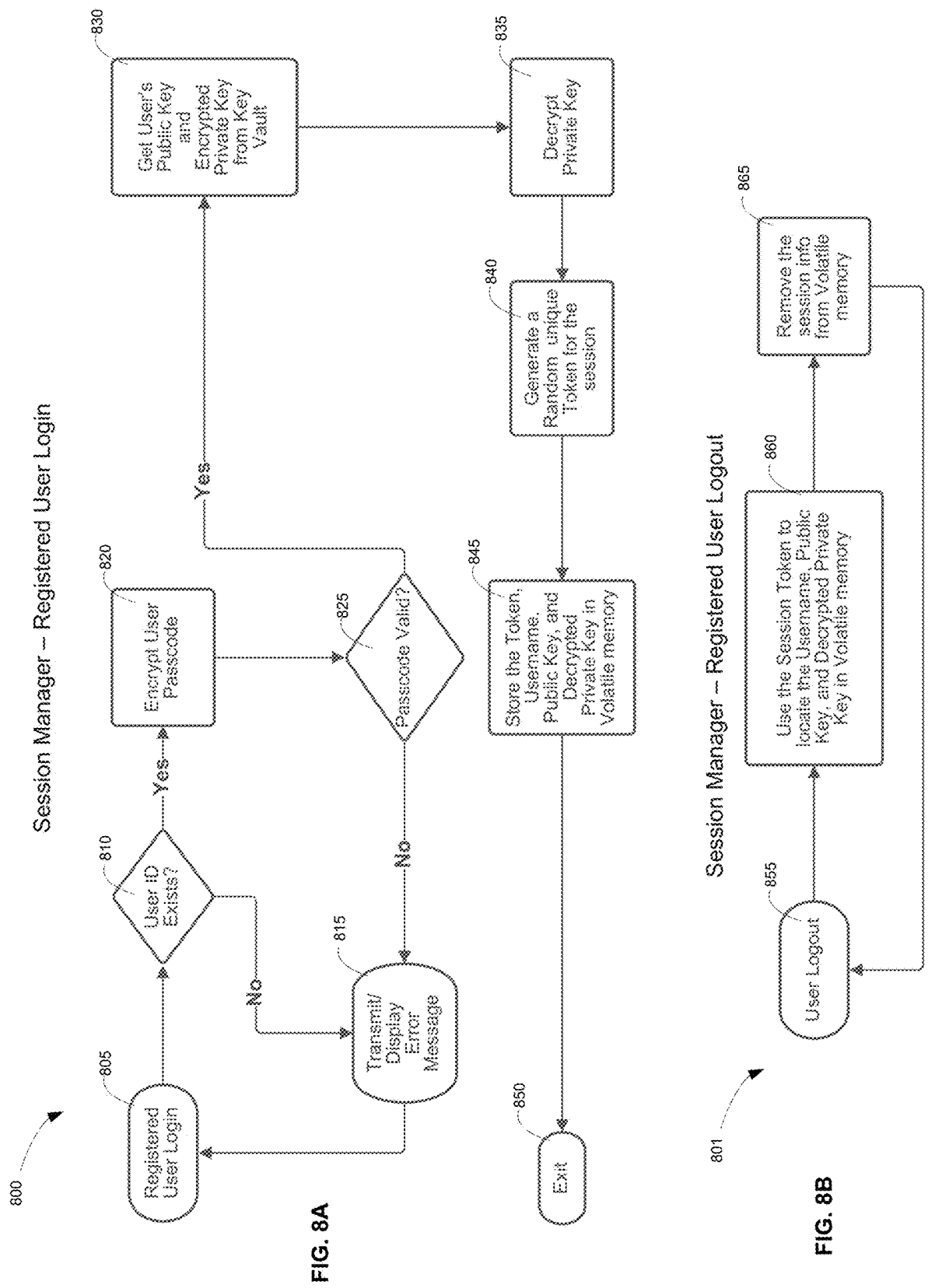
FIG. 8A shows a high-level flow diagram illustrating, by way of example, the steps of an algorithm executed by the microprocessor, operating under the control of the session manager, to establish a new session for a registered user in response to the registered user logging into the system in accordance with one embodiment of the present invention.
FIG. 8B shows a high-level flow diagram illustrating, by way of example, the steps of an algorithm executed by the microprocessor, operating under the control of the session manager, to terminate a session for a registered user in response to the registered user logging out of the system in accordance with one embodiment of the present invention.
Figure 9:
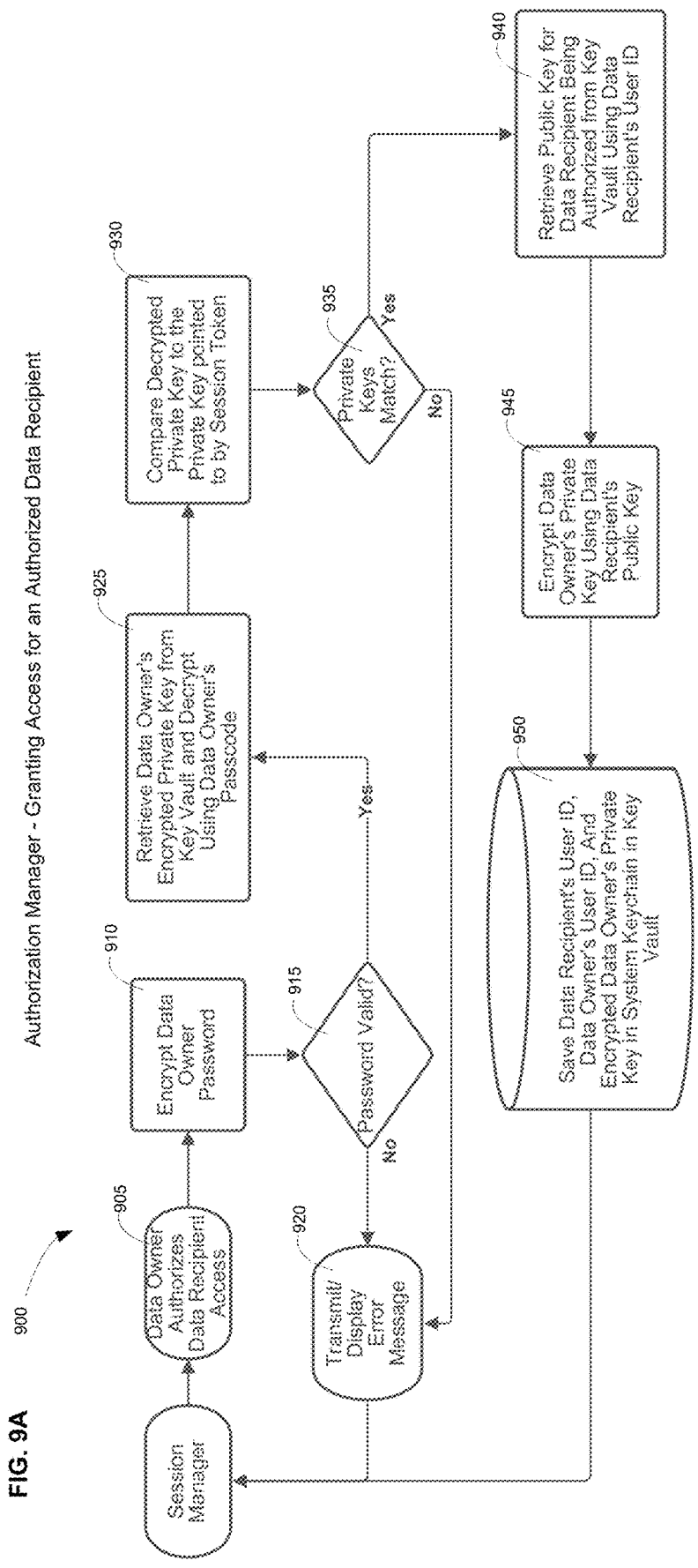
FIG. 9A shows a high-level flow diagram illustrating, by way of example, the steps of an algorithm executed by the microprocessor, operating under the control of the authorization manager, to grant access for an authorized data recipient in accordance with one embodiment of the present invention.
FIG. 9B shows a high-level flow diagram illustrating, by way of example, the steps of an algorithm executed by the microprocessor, operating under the control of the authorization manager, to revoke access for an authorized data recipient in accordance with one embodiment of the present invention.

FIG. 7 shows a high-level flow diagram illustrating, by way of example, the steps of an algorithm 700 executed by the microprocessor 442, operating under the control of the user registration manager 461, to establish an account for a new user in one embodiment of the present invention. The user registration manager 462, comprising programming instructions arranged to cause the microprocessor 442 to carry out the steps in the algorithm 700 shown in FIG. 7, will typically be called from a main program running on the KDMA 440. However, it may also be called from any other program or module. It is noted that the user registration manager 461 and microprocessor 442 may execute more or fewer steps, as necessary, depending on the application, in order to establish new accounts, without departing from the scope of the invention. Some of the steps shown in FIG. 7, such as transmitting and/or displaying prompts and error messages, may be carried out in part by operation of the microprocessor 442 under the control of the programming instructions embodied in the graphical user interface 463 of the KDMA 440.

As shown in FIG. 7, the first step for registering a new, unregistered user (step 705) is to prompt the unregistered user to provide a user id and a passcode (typically comprising a username and password, although biometric data, such as a fingerprint or facial ID could also be used). In step 710, the system (i.e., the program and the microprocessor 442) determines whether the user ID entered by the unregistered user already exists. If the user ID already exists, the system transmits and/or displays an error message (step 735). The error message will typically be displayed on whatever device the new user is using. The device may comprise, for instance, a personal computer, a smartphone, a telematics box in a vehicle, or any other device operated or controlled, directly or indirectly, by the user. In other cases, the new user could be another program running on another server, in which case the error message would be transmitted to the other program for handling and/or further processing. If the answer in step 710 is "No" (the user ID entered by the new user does not already exist), the system, in step 715, will verify that the passcode was entered in a valid format. If the answer is "No," an appropriate error message is transmitted and/or displayed (step 735). If the answer is "YES," the system will next ask the new user for a valid public/private keypair (step 720). If the new user supplies a keypair, the system attempts to verify it and transmits/displays an error message of the supplied keypair cannot be verified (see steps 720, 725, 730 and 735 of FIG. 7). If the user does not supply a public/private keypair, the system may be configured, as shown in step 740 of the algorithm 700 of FIG. 7, to automatically generate a new public/private key pair and assign it to the new user. Then the system will encrypt the new user's private key with the passcode (step 745), encrypt the passcode (step 750), and then save the user ID, the encrypted passcode, the public key, and the encrypted private key in the user's keychain 492 of the key vault 491 on the non-volatile secondary memory device 490 (step 755). Then the system will exit the registration manager program (step 760) and pass control of the microprocessor back to the main program.

FIG. 8A shows a high-level flow diagram illustrating, by way of example, the steps of an algorithm 800 executed by the microprocessor 442, operating under the control of the session manager 465, to establish a new online session for a registered user in response to the registered user logging into the system in accordance with one embodiment of the present invention. It is noted that the session manager 465 and microprocessor 442 may execute more or fewer steps, as necessary, depending on the application, in order to establish an online session, without departing from the scope of the invention. Some of the steps shown in FIG. 8A, such as transmitting and/or displaying prompts and error messages, may be carried out in part by operation of the microprocessor 442 under the control of the programming instructions embodied in the graphical user interface 463 of the KDMA 440.

As shown in FIG. 8A, a registered user (which may comprise an application running on a remote device) logs into the KDMA 440 (step 805) with a user ID and a passcode. If the user (or the application representing the user) does not supply a valid user ID, then the program transmits and/or displays an error message (see steps 810 and 815). Next, in step 820, the system encrypts the supplied passcode (step 820) and compares it to the encrypted passcode stored on the user's keychain 492 in the key vault 491 on the non-volatile secondary memory device 490. Any user's passcode may be encrypted and decrypted using any suitable algorithm, such as a cryptographic hash function (CHF) with a salt. Notably, for security purposes, in embodiments of the present invention, the user's passcode is never stored in a non-volatile memory device on the KDMA 440 in unencrypted format. So the unencrypted password can never be read or stolen by an unauthorized party, even if other security measures on the KDMA 440 are somehow defeated. Moreover, even the system operator can never acquire and see a user's passcode.

In steps 830, 835, 840 and 845, the session manager 465 retrieves the user's public key and encrypted private key from the user's keychain 492 in the key vault 491 (step 830), decrypt's the user's private key using the passcode the user just entered while logging in in step 805 (see step 835), generates a random unique token for the session (step 840), and then stores the token, user ID, public key, decrypted private key in a new user session record 482 created by the session manager 465 in transient memory 480 on the volatile memory device 450. All subsequent actions (instructions and requests for data, for example) performed by the user (or the program/application representing the user) must be accompanied by the session token. At this point, the microprocessor 442 exits the session manager 465.

Importantly, the user's session record 482 (and token) will only exist in transient memory 480 on the volatile memory device 450, and only so long as the user (or the user's program/application) remains in an active session on the KDMA 440. As soon as the active online session ends (such as when the user logs out or the program/application terminates), the session record 482 for the user, and all of the data and information it contains, is deleted from the volatile memory device 450. FIG. 8B shows a high-level flow diagram illustrating, by way of example, the steps of an algorithm 801 executed by the microprocessor 442, operating under the control of the session manager 465, to terminate a session for a registered user in response to the registered user logging out of the system in accordance with one embodiment of the present invention. As shown in FIG. 8B, when the session manager 465 receives a logout instruction from the user (in step 855), the session manager 465/microprocessor 442 uses the session token created in step 840 to locate the user's session record 482 (containing the user's user ID, public key and decrypted private key) on the volatile memory device 850 and removes the session record 482 from the volatile memory device 450 (see steps 860 and 865).

FIG. 9A shows a high-level flow diagram illustrating, by way of example, the steps of an algorithm 900 executed by the microprocessor 442, operating under the control of the authorization manager 464, to grant access for an authorized data recipient in accordance with one embodiment of the present invention when a data owner authorizes a data recipient to access his or her encrypted electronic information stored in the encrypted electronic database 494 on the non-volatile secondary memory device 490 (step 905). The system first encrypts the data owner's passcode (step 910), verifies that the encrypted passcode is the same as the encrypted passcode stored on the data owner's keychain 492 of the key vault 492 (step 915), and transmits/displays an error message if the encrypted passwords do not match (step 920). If the encrypted passwords match, however, the system retrieves the data owner's encrypted private key from the data owner's keychain 492 of the key vault 491, decrypts the encrypted private key using the data owner's passcode (step 925), and compares the data owner's decrypted private key to the data owner's decrypted private pointed to by the data owner's session token (step 930) to see if they match (step 935). If the private keys match, the system retrieves the authorized data recipient's public key from the authorized data recipient's keychain 492 in the key vault 491 (step 940), encrypts the data owner's private key using the data recipient's public key (step 945), and saves the authorized data recipient's user ID, the data owner's user ID and the data owner's encrypted private key in the system keychain 493 of the key vault (step 950).

FIG. 9B shows a high-level flow diagram illustrating, by way of example, the steps of an algorithm 901 executed by the microprocessor 442, operating under the control of the authorization manager 464, to revoke access for an authorized data recipient in accordance with one embodiment of the present invention. When the system receives a revocation instruction from a data owner (step 955), the system uses the data owner's user ID to retrieve an authorization record from the authorized data recipient's keychain 492 in the key vault 491 (step 960). The system then removes the data owner's encrypted private key from the authorized data recipient's keychain 492, which effectively prevents the authorized data recipient from gaining access to any of the data owner's encrypted information on the KDMA 440. In some cases, the access authorization and the access revocation may be applied to only a portion of the data owner's encrypted information, depending on the access type. The authorization may be limited to a specific portion of the data owner's encrypted data (specific access type), or the authorization may permit the authorized data recipient to access all of the data owner's encrypted information on the KDMA 440 (implicit access type).

An important advance over conventional encrypted data management systems provided by embodiments of the present invention is that, at no time does the KDMA 440 of the present invention save in non-volatile memory 490 an unencrypted copy of any user's passcode, an unencrypted copy of any user's private key, or an unencrypted copy of any users electronic information. Because of this important and advanced security feature, the KDMA 440 of the present invention does not have access, and cannot gain access to any user's passcode or private key unless that user is currently logged into the system and currently in an active online session. In order to permit an authorized data recipient to access a data owner's encrypted electronic information, the KDMA 440 must create an authorization record for the authorized data recipient in the authorized data recipient's keychain 492. Because creating an authorization requires a copy of the authorized data recipient's private key, the system can only create the necessary authorization record in the authorized data recipient's keychain 492 while the authorized data recipient is logged on and in an online session. Because the authorized data recipient may not be logged in when the authorization is granted by the data owner, the creation of the authorization record for the authorized data recipient must wait at least until the next time the authorization data recipient logs in after the access authority is granted. Therefore, the procedure executed by the KDMA 440 to allow an authorized data recipient to acknowledge and accept an authorization will typically be carried out by the KDMA 440 at a later time, separate and apart from the procedure executed by the KDMA 440 to permit a data owner to grant such an authorization.

Figure 10:
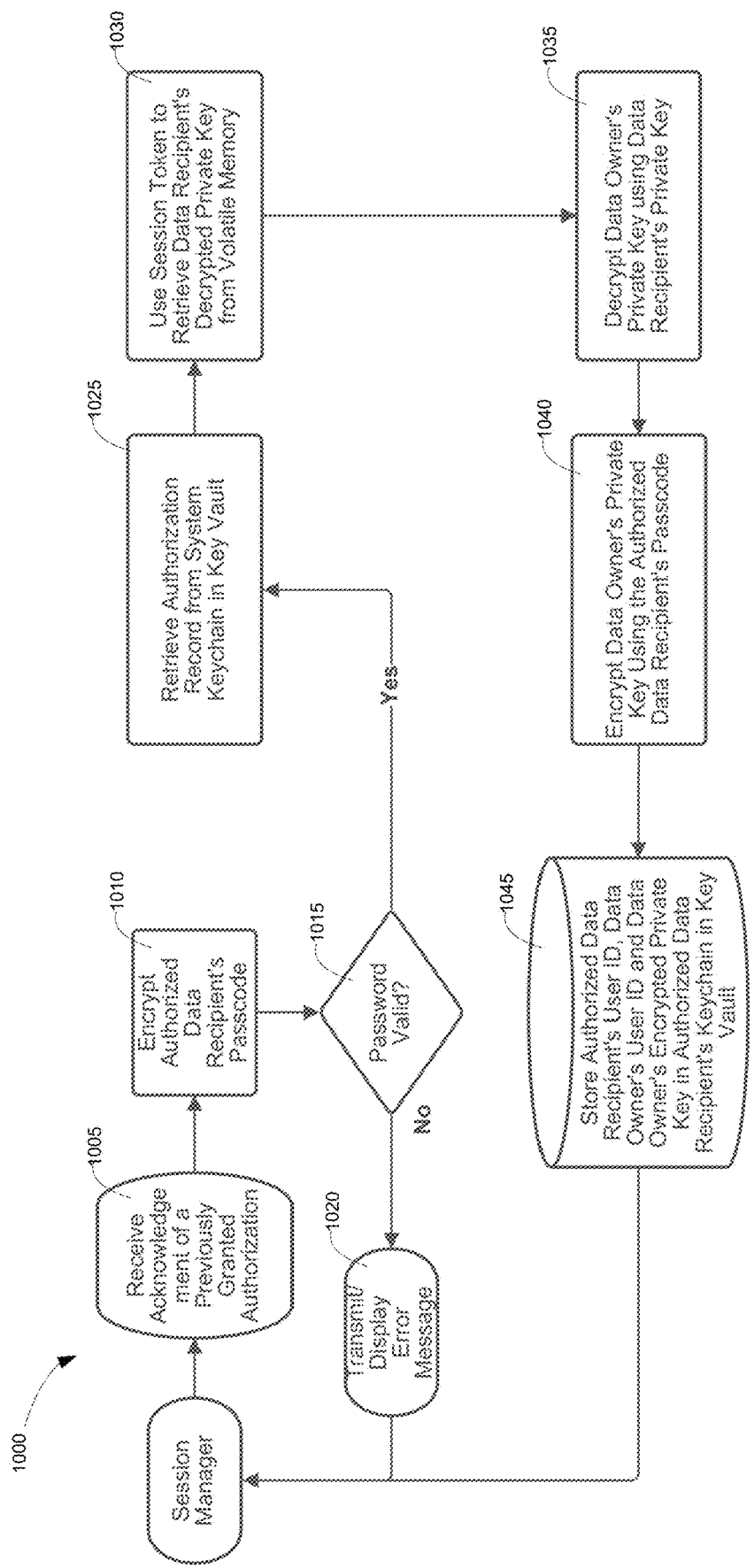
FIG. 10 shows a high-level flow diagram illustrating, by way of example, the steps of an algorithm executed by the microprocessor, operating under the control of the authorization manager, to update an authorized data recipient's keychain after the authorized data recipient acknowledges authorization to access data owner's encrypted electronic documents in accordance with an embodiment of the present invention.

FIG. 10 shows a high-level flow diagram illustrating, by way of example, the steps of an algorithm 1000 executed by the microprocessor 442, operating under the control of the authorization manager 464, to create an authorization record in an authorized data recipient's keychain 492 when the authorized data recipient acknowledges and accepts a previously granted authorization to access a data owner's encrypted electronic documents. As shown in FIG. 10, the steps carried out by the microprocessor 442 when an authorization is acknowledged by an authorized data recipient include receiving an acknowledgement from of the previously granted authorization from the authorized data recipient (step 1005), encrypting and verifying the authorized data recipient's passcode (steps 1010, 1015 and 1020), retrieving the authorization record from the system keychain 493 of the key vault 491 (step 1025), and using the authorized data recipient's current session token to retrieve the authorized data recipient's decrypted private key from the transient data area 480 of the volatile memory device 450 (1030). As previously stated, the authorized data recipient's decrypted private key was not available to the KDMA 440 until the authorized data recipient logged on and the session manager 465 created the now-existing session token. Then, in step 1035, the program instructions in the authorization manager 464 causes the microprocessor 442 to use the authorized data recipient's private key to decrypt the data owner's private key (note that the data owner's private key was previously encrypted using the authorized data recipient's public key and saved in the system keychain 493). The system then encrypts the data owner's private key using the authorized data recipient's passcode (step 1040) and saves the authorized data recipient's user ID, the data owner's user ID and the data owner's encrypted private key in the authorized data recipient's keychain 492 in the key vault 491 on the non-volatile secondary memory device 490 (step 1045).

Figure 11:
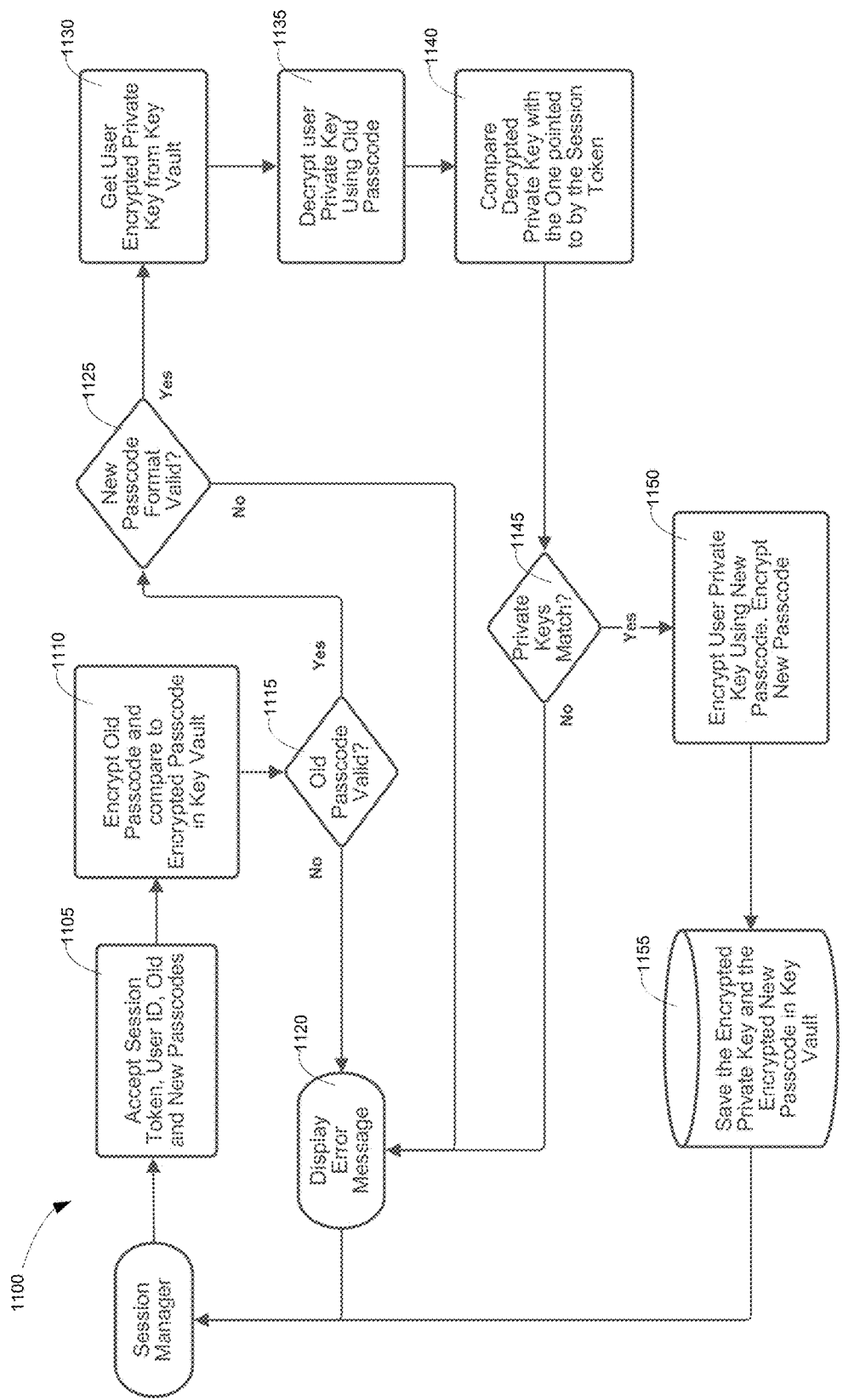
FIG. 11 shows a high-level flow diagram illustrating, by way of example, the steps of an algorithm executed by the microprocessor, operating under the control of the user credential manager, to update a registered user's keychain in the key vault in response to the registered user changing his or her passcode in accordance with an embodiment of the present invention.

FIG. 11 shows a high-level flow diagram illustrating, by way of example, the steps of an algorithm 1100 executed by the microprocessor 442, operating under the control of the user credential manager 462, to update a registered user's keychain in the key vault in response to the registered user changing his or her passcode in accordance with an embodiment of the present invention. The algorithm 1100 begins by accepting and verifying the session token, user ID, old passcode and new passcode of the registered user (see steps 1105-1125). Next, the system retrieves the encrypted private key for the registered user from the registered user's keychain 492 in the key vault 491, (step 1130), decrypts the user's private key using the old passcode (step 1135), compares the decrypted private key with the private key pointed to by the session token to confirm a match (steps 1140 and 1145). If they match, the system encrypts the user's private key using the new passcode and encrypts the new passcode (step 1150). Finally, the system saves the user's encrypted private key and the user's new encrypted passcode in the user's keychain 492 in the key vault 491.

Figure 12:
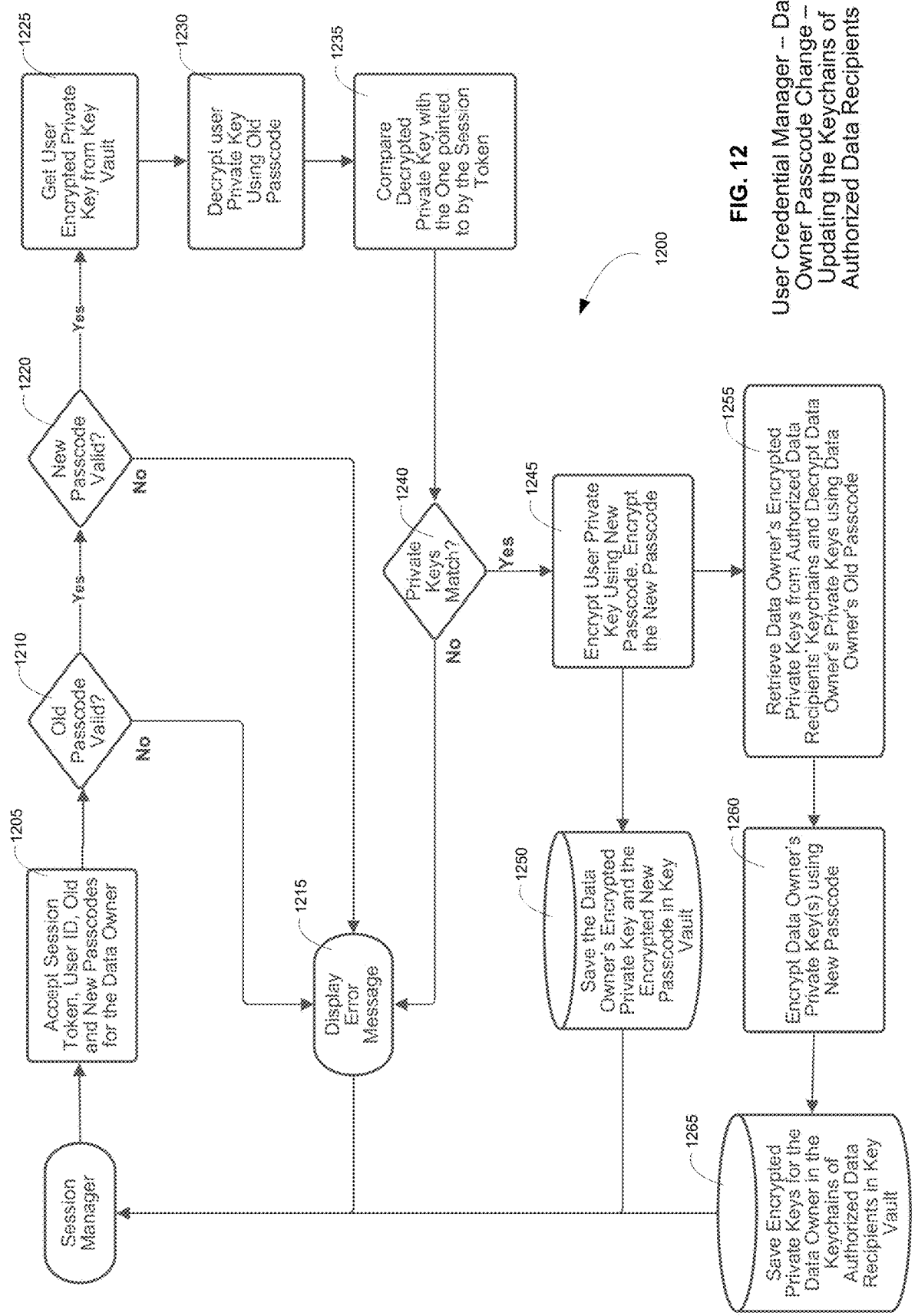
FIG. 12 shows a high-level flow diagram illustrating, by way of example, the steps of an algorithm executed by the microprocessor, operating under the control of the user credential manager, to update an authorized data recipient's keychain in the key vault after the data owner changes his or her passcode in accordance with an embodiment of the present invention.

FIG. 12 shows a high-level flow diagram illustrating, by way of example, the steps of an algorithm 1200 executed by the microprocessor 442, operating under the control of the user credential manager 462, to update an authorized data recipient's keychain 492 in the key vault 491 after a data owner changes his or her passcode in accordance with an embodiment of the present invention. As shown in FIG. 12, the algorithm 1200 begins by accepting and verifying the data owner's session token, user ID, and old and new passcodes (see steps 1205-1215). Next, the system retrieves the encrypted private key for the data owner from the data owner's keychain 492 in the key vault 491, (step 1225), decrypts the data owner's private key using the old passcode (step 1230), compares the decrypted private key with the private key pointed to by the session token to confirm a match (steps 1235 and 1240). If they match, the system encrypts the data owner's private key using the data owner's new passcode and encrypts the new passcode (step 1245). The system then saves the data owner's encrypted private key and the data owner's encrypted new passcode in the user's keychain 492 in the key vault 491 (1250).

Because the data recipient changed his or her passcode on the system, the system also has to update the authorization records in the keychains 492 of all of the authorized data recipients who are authorized to have access the data owner's encrypted information. Therefore, in steps 1255, 1260 and 1265, the system retrieves from the keychains of all of the authorized data recipients the encrypted private keys of the data owner (step 1255), decrypts all of the retrieved encrypted private keys using the data owner's old passcode (also shown in step 1255), encrypts all of the data owner's private keys using the data owner's new passcode (step 1260), and saves all of the encrypted private keys for the data owner in the keychains 492 of all the authorized data recipients, respectively, in the key vault 491 (step 1265).

For the purpose of further illustrating and increasing comprehension of the structures, methods and advantages of embodiments of the present invention, several "use cases" for some embodiments of the present invention will now be presented.

Vehicle Telematics (Car Rental Scenario) Use Case

When a vehicle is rented, as part of taking control of the vehicle, embodiments of the present invention may be configured to prompt the renter to enter a username and passcode into the vehicle's information and entertainment system (or "infotainment" system). The infotainment system includes an operating system into which certain components of the present invention have been integrated. The onboard components of the present invention, which may include a client-based version of the credential manager and/or registration manager configured to operate in conjunction with server-based counterparts via an API, will generate an encryption key pair for the renter. This key pair is then used by a local encryption engine on the infotainment system to encrypt all the personally identifiable information generated about the renter, such as the vehicle location, the addresses entered into the vehicle GPS system, etc. In the event the renter connects a smartphone to the vehicle's infotainment system, all the contact information, phone calls, text messages sent and received, etc. will be encrypted using the renter's public key prior to local storage and transmission to a central server. Upon the return of the vehicle to the car rental company, the renter would log out of the vehicle management system, terminating the encryption of the encryption based on the renter's encryption keys and be ready for the next renter to perform the same function when they take control of the rental vehicle.

Vehicle Telematics (Car Purchasing Scenario) Use Case

In a car purchasing scenario, the purchased vehicle is configured to automatically collect, encrypt and store vehicle data on a central server. The central server includes a private data vault configured to receive over an Internet connection and store, in encrypted form, all of the private data and information generated and stored in the vehicle while the vehicle is operated under the control of the buyer. When the buyer takes control of the vehicle, and logs into the infotainment system, he or she becomes the new "data owner" for that vehicle.

Accordingly, when the new buyer takes control of the vehicle, preferred embodiments of the invention may be configured to present the buyer with an opportunity to "opt in" to a pre-installed "private data security and control" feature that comes with the vehicle. The buyer may opt into the private data security and control system by manipulating onscreen menus and buttons built into the operating system of the vehicle's infotainment system, or alternatively, by using a separate personal computer connected to the Internet to access a website associated with the private data security and control feature to complete an online registration procedure associated with private data vault.

In some embodiments, a program running on the buyer's smartphone may be configured to perform the logging in, setting up and keypair assignment steps upon pairing of the buyer's smartphone with the vehicle's infotainment system. When the pairing of the smartphone is terminated, the system may be configured to stop collection and encrypting and uploading vehicle information. Beneficially, using an application on the smartphone may serve to completely automate the process of encrypting and uploading the electronic information, eliminating the need for the buyer to perform the login/logout steps and supplying a username and password when taking/relinquishing control of the vehicle. Using a smartphone application to perform this function would also enable the buyer to pre-configure a preference for data sharing/encryption rules they would like to apply to the vehicle's information. Preferably, the buyer would still have the option of modifying preferences on each vehicle's data encryption rules if they so choose.

In the course of completing the registration procedure, the buyer establishes herself as the data owner and identifies his or her specific vehicle by entering, for example, the vehicle identification number (VIN) of the vehicle, and/or a code or serial number for the vehicle's infotainment system or telematics box, and then sets up a username and passcode. Alternately, the vehicle's infotainment system can automatically provide the vehicle identification number for the purposes of tracking the information about the vehicle.

During the registration procedure, the private data vault will generate and assign to the data owner a public/private key pair and use the data owner's passcode to encrypt the data owner's private key. The system will also create and store in the private data vault a record that links the data owner to his or her specific vehicle. If the data owner already has a username/password registered with the invention, he or she can opt for using the same username/password combination to track all vehicles under their control. Or they can opt for creation of new username/passcodes for each vehicle, which would create a new unique encryption keypair to encrypt/allow access for each vehicle separately.

Subsequently, when the data owner enters the username and passcode into the telematics box and/or infotainment system of the vehicle, the data owner's public key is used to encrypt any and all of the private data received, created and/or stored on the vehicle. In some embodiments, the private data is encrypted immediately by a data encryption engine located inside the vehicle itself. In other embodiments, the private data may be temporarily stored in clear text form in a memory storage device (such as a hard drive) located in the vehicle, and then encrypted only after the private data is transmitted to the private data vault. The system may also be configured to transmit data to the private data vault only when the vehicle can establish a reliable and secure Internet connection to the private data vault (such a reliable and secure connection may be established automatically when the vehicle is parked at the data owner's home). Preferably, after the private data is encrypted and/or transmitted to the private data vault, any unencrypted private data may be automatically deleted from the vehicle. If the encryption is not performed on the vehicle prior to transmission, the data along with the username and public key can be transmitted to the server and passed along to the data encryption engine (DEE) to perform the encryption prior to storing the record on the persistent storage on the server(s).

It is anticipated by the inventors that the private data vault will likely be operated and managed by a private data vault service provider, who may not be affiliated with manufacturer of the vehicle or the company that sells, rents or leases the vehicle. However, embodiments of the present invention may be configured to provide, only with the data owner's permission, selective access to the data owner's private data. In other words, the data owner remains in complete control over who, if anyone, can gain access to the data owner's private data. The manufacturer and/or third party may (or may not) be required to pay a fee to the data owner and/or vault operator to have such access. Since the invention never stores any private key information in unencrypted form in any persistent memory throughout the process, the operator of the data store and retrieval service will not have read access to any of the encrypted data. The encrypted private keys for all the processes within the invention are encrypted using the data owners' passcodes, which are also never stored within the system. Therefore, the only possible way to access and decrypt any of the encrypted data is by an authorized user's login and passcode.

More specifically, the vehicle manufacturer or any other third-party, can gain access to the private data by registering with the operator of the private data vault. Such registration will permit the manufacturer or other third party to submit a request to the operator for access to the data owner's private data, which will only be granted if the data owner authorizes (or has previously authorized) such requested access. In some embodiments, the manufacturers/third party may need to register only once to gain access to the private data generated by all the vehicles whose owners have decided to share their private data. Any manufacturer/third-party companies that have been authorized by the owner to have access to the data will use their credentials to log into the system that is receiving the vehicle data and, because of the authorization by the owner, they will be provided with the proper encryption keys to access only the fields/record the owner/driver has authorized them to see without revealing the encryption keys to the manufacturer/third party. Any data/record that has not been authorized by the owner/operator to be visible to the manufacturer/third party will remain encrypted, rendering the content of the data/record unintelligible.

When a third-party, such as the manufacturer of the vehicle, registers with a service that is storing the vehicle information, they will provide a username/passcode for the registration. Upon registration they are assigned a public/private keypair for their username/passcode combination. Alternately, they can decide to provide their own existing/valid public/private keypair for the registration. Their public key would then be encrypted using their passcode, and stored in the key vault along with their username and public key. When the third-party logs into the system, the third party's passcode is used to decrypt the third-party's private key, which is then stored in transient memory. A randomly generated token that points to the unencrypted private key is created for duration of the session and forwarded back to the user's session to be used for any subsequent actions by the third-party that requires access to the third-party's private key.

When the third-party submits a request for access to a specific vehicle's electronic information, the request is forwarded to the data owner of the vehicle's information. The owner is notified through an email or a text message with a link to guide them back to the action to be taken on the request. The data owner would then log into the system by providing their username/passcode, which would then enable the system to retrieve their encrypted private key from the key vault, decrypt the private key using the owner's passcode, store the private key in transient memory, and create a randomly generated unique token that would point back to where the encrypted key is stored in memory. This token would be valid for the duration of the session or for a finite period of time based on the implementation. The owner can then decide to approve or reject the request for access. Upon approval, the system will use the token to locate data owner's unencrypted private key in transient memory, retrieve and use the requester's public key to encrypt the data owner's private key, and store the encrypted private key in the key vault for the requester's acknowledgement. The system would then notify the requester of the approval using an email or text message with a link back for subsequent steps to be performed by the requester. The vehicle owner can specify implicit access to the information, meaning all the records and fields, or explicit access, which would mean records and or fields that meet a certain criterion. For example, the owner might decide to share all the data from all his or her vehicles with members of his or her family, only specific vehicles and engine operational data for those vehicles with various manufacturers, only vehicle speed information with their insurer(s), and engine specific data with a third-party service provider. These implicit and explicit shared data instructions are stored along with the authorization records for each third-party. Upon third-party's access request for the data, these instructions are retrieved and acted upon prior to the decryption and presentation of the data to the third-party.

Acting on the notification, the requester would then log into the system using the requester's username/passcode. The system would use the requester's passcode to decrypt the requester's private key, store the decrypted private key in transient memory, and create a randomly generated unique token that would point back to where the encrypted private key is stored in memory. This token would be valid for the duration of the session or for a finite period of time based on the implementation. Upon acknowledgement of the approval by the requester, the system would retrieve the owner's private key that has been encrypted using the requester's public key during the owner's approval session, use the requester's private key in transient memory pointed to by the session token to decrypt the owner's private key, re-encrypt the owner's private key using the requester's passcode, and store the data owner's encrypted private key in the requester's keychain in the key vault.

When the requester attempts to access vehicle information for a vehicle whose owner has granted the requester access to the data, the requester would log into the system by providing username and passcode. The passcode would then be used by the system to decrypt the data owner's private key, store the private key in transient memory, create a unique randomly generated token that points back to the stored private key, and passes back the token to the requester's session for subsequent use as the requester accesses the owner's vehicle data. Upon accessing the data, the requester's session token would be used to locate the owner's unencrypted private key in transient memory, which will then be used to decrypt the data owner's encrypted data as permitted by the data owner's authorization, and present the decrypted data to the third party. When the third party requests access to the information, its program(s) will pass the token as part of the request to the Data Decryption Engine (DDE) on the server(s). The DDE will extract the specific records and fields as permitted by instructions supplied by the data owner and use the token to the locate the data owner's decrypted private key to decrypt the records/fields and pass the data to the requester. At no time will any of the requester's programs, systems or users have access to the data owner's decrypted private key.

If/when and data owner decides to rescind the authorization for access by the requester, the data owner would log into the system, view a list of approved requesters, and select the requester to be deauthorized. Upon deauthorization, the owner's encrypted private key stored in the third-party's keychain would be located using owner username and removed from the requester's keychain, thereby terminating the requester's ability to access the data owner's electronic information on the server.

Vehicle Telematics (Car Leasing Scenario) Use Case

Suppose Alice leases from her local car dealer, Carl's Cars, a late model vehicle manufactured by the Ford Motor Company ("Ford"). Because Alice is protective of her privacy, she makes sure that she leases a Ford vehicle that comes with the private data vault feature installed. The back end server for the private data feature is owned and operated by a company called Data Protection Services, Inc., ("DPS"). When she gets home with her new Ford, Alice dutifully logs into the private data vault server operated by DPS, registers her vehicle and establishes an account, a username and a password. Alice also sees, during her registration, that certain companies, including Ford and Carl's Cars, will give her a significant discount towards the purchase or lease of her next vehicle, if she agrees to permit Ford and Carl's Cars, to access and download some, but not all, of her telematics data during the lease's term. Alice agrees, making sure she checks a box that prevents any company from accessing and downloading any of her personal smartphone data (e.g., her contacts) sync'd to the vehicle. Notably, Alice also wants to be able to log into the DPS system to retrieve both her smartphone data and her vehicle's telematics data. As Alice completes the registration procedure, the private data vault server creates and assigns to Alice a private key and a public key. The private data vault then creates in memory a keychain for Alice. The private data vault then uses Alice's password to encrypt Alice's private key. Alice's unencrypted public key and Alice's encrypted private key are both then stored in Alice's keychain in the vault.

When Alice re-enters and starts up her new Ford vehicle, the infotainment system prompts Alice to enter her username and password in order to activate the private data vault service, and Alice complies. After Alice enters her username and password, Alice's public key is automatically downloaded and stored in the vehicle. Alice may also be prompted by her vehicle to enter the name and passcode of her secured WI-FI network, which the vehicle can connect to automatically whenever the Ford vehicle is parked in front of Alice's house or enters Alice's driveway or garage. Alternately, if the invention has been implemented by the smart phone platform used by Alice, when Alice connects her smart phone with the vehicle's infotainment system, the smart phone will automatically log Alice into the vehicle's infotainment system upon Alice's approval of the interaction and provide Alice's public key to the vehicle for encryption purposes.

Subsequently, whenever Alice drives her Ford vehicle, or syncs her smartphone data with the infotainment center in the Ford vehicle, a microprocessor in the vehicle, operating under the control of a local application program executing in the volatile memory of the vehicle, uses Alice's public key to automatically encrypt all of Alice's personal data sync'd to the vehicle from her smartphone, as well as all of the vehicle's telematics data, and store the encrypted data on a local hard drive inside the vehicle. When Alice pulls the vehicle into her driveway or garage, the private data vault system automatically connects to Alice's home WI-FI network and uploads Alice's encrypted personal data and the vehicle's encrypted telematics data to the private data vault server operated by DPS. Alternatively, the vehicle may be equipped with a cellular radio, configured to automatically upload the encrypted data by periodically establishing and using a secure VPN connection to the DPS server while Alice is driving the vehicle and is therefore away from her home WI-FI network. The vehicle may also utilize Alice's smart phone to establish a connection with the cell network to continuously transmit the vehicle information to DPS.

Ford has previously registered with DPS' private data vault service and previously requested permission to access and download the telematics data for all Ford vehicles for which the owners/leasers have given their permission for such access. During Ford's registration, Ford created a passcode and the private data vault created a public key and a private key pair for Ford. Ford's passcode was then used to encrypt Ford's private key. Ford's encrypted private key and Ford's unencrypted public key were then stored in Ford's keychain in the vault.

When Alice created her account on the DPS server and gave permission for DPS to permit Ford to access and download Alice's vehicle's telematics data, an authorization manager running on the DPS server used Alice's password to decrypt Alice's private key and Ford's password to encrypt Alice's private key. Alice's encrypted private key is then stored in Ford's keychain in the key vault.

When Ford accesses information transmitted by Alice's vehicle and stored on DPS' server(s), the invention will use Ford's passcode to decrypt Alice's private key and store the private key in transient memory on DPS' server(s). The invention would then pass a randomly generated token to Ford that would be used by Ford during the retrieval of the vehicle information. Any access attempted by Ford would be required to pass the token to DPS' servers, which would allow the server(s) to access Alice's private key in transient memory to decrypt Alice's vehicle's encrypted information prior to transmission to Ford. Upon requesting the data, the program used by Ford will pass the token to the DPS server, which will be used by Data Decryption Engine (DDE) on the DPS server(s) to locate the decrypted private key for Alice and used to decrypt and pass the requested records to Ford based on Alice's instructions on which fields/records should be shared with Ford. At no time will any of Ford's programs or personnel have direct access to Alice's decrypted private key.

When Alice attempts to access information about her vehicle, she would login to DPS's system using her username/passcode through a browser session or a DPS custom application running on a PC or smart phone. Upon logging in, Alice's encrypted private key is retrieved from DPS' key vault, decrypted using Alice's passcode, and stored in transient memory. A token is provided back to Alice's session to be used by Alice's subsequent actions to retrieve, review, or download the vehicle information for decryption purposes.

Suppose further that Carl's Cars Wishes to register as a user on the system and submit a request to download Alice's data from the DPS Server. Unlike Ford, Carl's Cars has not previously asked for permission to see the data for all car owners. Instead, Carl's Cars just wants to see Alice's data and Carl's request comes after Alice has already registered on the system. In this case, the KDMS would be configured to send a notice to Alice that Carl's Cars would like to access her vehicle's information. Alice can then review, approve, or reject the request for a single or multiple cars registered under her username. This notification can be in the form of an email or a text with a link back to the request to be processed on DPS' systems. Upon approval, Alice's unencrypted private key would be encrypted using Carl's Cars' public key and stored in DPS's system awaiting acknowledgement by Carl's Cars. Carl's Cars would be notified through email or text with a link back to the subsequent steps on DPS' systems. Carl's Cars would then interact with DPS' systems to acknowledge the approval by logging in, which would cause DPS' systems to use Carl's Cars passcode to decrypt Carl's Cars private key, store the decrypted private key in memory, and provide Carl's Cars' session with a token to be used for Carl's Cars' subsequent interactions with the system. Upon Carl's Cars acknowledgement, DPS' systems would use Carl's Cars unencrypted private key in transient memory to decrypt Alice's private key, encrypted with Carl's Cars public key, and stored in Carl's Cars keychain.

It will be appreciated that, as the data owner, Alice can exercise complete control over who can see the electronic information collected from her vehicle by identifying specific data/records or the entire collection of data for service/maintenance or to provide assistance. For example, Alice may decide to allow Ford to see all the engine specific data, but not the information about the locations the vehicle has been driven to, her voice commands, her contact lists, her text messages, etc. Similarly, Alice may choose to allow her roadside assistance provider to see the location of the vehicle, but not the personal information regarding text messages, songs played, etc. If the requester is an insurance company that provides incentives and discounts for owners/operators whose vehicles are operated within legal speed limits, then Alice may decide to share vehicle speed, as well as the posted speed for any GPS location, without granting access to the actual GPS location of the vehicle, which might allow Alice to take advantage of the discounts without sharing all of her travel data an history.

If an owner/operator needs to revoke authorization for any third-party, such as when they change insurance companies, the owner/operator, would access the list of third parties that can access the information, deauthorize the previous insurance company, and authorize the new insurance company, assuming the new insurance company is registered with the system. Upon deauthorization of the previous insurance company, the encryption keys will be made unavailable to the old insurance company and the new insurance company will be provided with access to the encryption keys when they attempt to read the vehicle information as authorized by the owner/operator.

Upon Alice's return of her vehicle to the dealer at the end of her lease period, Alice could simply log herself out of the data protection system that came with the vehicle, which would remove her credentials and encryption keys from the system, making the system available for the next owner to similarly provide a username and passcode and have their encryption keys be applied to the data as they operate the vehicle. The electronic information collected, encrypted and stored during Alice's leasing period will remain encrypted and only accessible by the previous owner's username/password. Alternatively, the system may be configure to delete all of Alice's information from both the vehicle's telematics box, as well as the central servers, depending on the implementation of the invention.

Healthcare Industry Use Case

The following paragraphs of this disclosure provide a detailed description of an exemplary patient healthcare data system arranged and configured to operate, in accordance with one embodiment of the present invention, to receive, store, manage and protect patient healthcare records, and permitting those patient healthcare records to be shared with specific patients and specific authorized healthcare partners without ever storing those patient healthcare records on a persistent memory storage device in unencrypted form. Unlike conventional secure data management systems, the embodiments of the present invention permit the data owners to grant and rescind authorized access to the private data without ever having to share the data owners' access credentials (usernames, passcodes or private encryption keys) with the authorized data recipients.

Healthcare industry is constantly grappling with the HIPAA rules that stipulate patient records must be kept confidential. Yet, patient medical records are almost always stored in unencrypted form (a.k.a., clear text) in large databases. This includes all diagnoses, prescriptions, lab results, charts, etc. are stored and shared in clear text. Usually, the only form of protection used to protect against unauthorized access to such patient records is "restricted access control," which means the database cannot be accessed without logging in with a valid username and password. But if a hacker acquires a valid username and password, or otherwise figures out a way to bypass the login procedure, then the hacker can easily steal data from the database, if not the entire database. Unfortunately, it is relatively easy for skilled bad actors to gain access to the usernames and passwords, which may be stored at any of the various doctors, labs, pharmacies, hospitals, insurance companies, etc. who regularly access the databases, compromising patient privacy and exposing these various entities to penalties due to violation of HIPAA. Once a hacker gains access to the computers and servers where the health information is stored, they can access and distribute patient information as has occurred already.

Utilizing one embodiment of the present invention, most or all the records regarding patient healthcare can be encrypted whenever those records are stored in a persistent memory location, thereby substantially eliminating the risk of the privacy of that data being breached or compromised.

In one implementation of the present invention for the healthcare industry, a doctor's office, clinic, or hospital will set up an admin username and passcode using the User Registration Manager (URM), which will be linked to a public/private key pair in the invention's key vault. The user's passcode will be used by URM to encrypt the user's private key prior to the storage of user credentials in the key vault. This ensures that even if the key vault is compromised, since the user is the only one with the knowledge of his or her passcode, the unencrypted private key will not be available to the hacker. A user can change his or her passcode by using the User Credentials Manager (UCM) when desired, which will use the user's old passcode to decrypt their private key and re-encrypt the private key using the new passcode. The passcode itself is never stored in unencrypted form on the system and is only present in clear text in volatile memory during the login process.

Subsequently, whenever the user logs in, the user provides a username and password to user session manager (USM), which would verify the accuracy of user's passcode, and once authenticated, would use the passcode to retrieve the user's credentials from the key vault, decrypt the private key, and store the user credentials including the decrypted private key in volatile memory. The USM will generate a unique randomly generated token that will be used by all other parts of the invention to locate the unencrypted private key to perform the encryption/decryption tasks during the user's session. The user's passcode is discarded and not stored in any form by the invention once the session is established. The generated token is passed back to the user to be used by all other programs that would be used during the session for data storage and retrieval.

For the employees who are interacting with the patient records, each employee will also be registered using the URM, and have their own unique usernames and passcodes, as well as their own public/private key pairs, with all the aforementioned logic for encrypting the user's private key using the user's passcode, and storing these credentials in the key vault. The Admin user will then authorize these employees to access any or all patient records implicitly, which means all information for all of some patients, or explicitly, which means all records for one or more patients, some records for one or more patients, or certain fields on some or all records for some or all patients. This is done using the invention's User Authorization Manager (UAM). When an employee is authorized, the UAM will use the Admin passcode to decrypt the Admin private key, encrypt the private key using the public key for authorized data recipient, and store the encrypted key, along with the implicit/explicit access instructions as selected by Admin to the key vault. Upon the login of the authorized data recipient subsequent to the authorization and acknowledgement of the authorization, the UAM will decrypt the Admin private key using the authorized data recipient's private key, re-encrypt the Admin private key using the authorized data recipient's passcode, and store the encrypted private key and authorization record in the key vault.

If the doctor's office, clinic or hospital chooses to allow patients to access their own records directly using a browser-based or custom application on a PC or smart phone, it would grant access to the patient in a similar manner as an employee. The patient would register with the system by providing a username and passcode to URM and be assigned a public/private keypair. The Admin would authorize the patient to have access to only their own information implicitly, meaning all their information, or explicitly, meaning certain fields and or records, using UAM. The patient would login to the system to acknowledge the authorization, which would prompt UAM to decrypt the Admin's encrypted key, re-encrypt using the patient's passcode, and store the patient authorization record including access limitations to only the patient's own records in the key vault.

If the doctor's office, clinic or hospital chooses to allow certain partners, such as pharmacies or other clinics/hospitals, to have access to the records for certain patients or certain other data regarding patients, they would follow the same process as granting access to employees or individual patients. The only difference would be the type of implicit/explicit access instructions granted to the third-party organizations.

For all three types of user, all access can be rescinded by the Admin taking action to revoke any or all access to any of the fields, records, patients. When any aspect of a user's access is desired, UAM can adjust the user access parameters in the key vault up to and including the deletion of the encrypted Admin private key for the user, which would render all of the patient records unreadable for the user.

When patient information is being stored in persistent storage, the doctor's office, clinic or hospital will interact with data encryption engine (DEE), which will encrypt all transmitted data using the Admin public key prior to storage in the entity's patient information database(s).

When patient information is being retrieved, the entity's programs/system will interact with the data decryption engine (DDE) by passing it the indexes for the data being retrieved along with the session token generated by USM during the user's login activity. The token will retrieve the decrypted Admin private key from volatile memory, apply the data access instructions, such as which fields/records/patient information are accessible by the user, extract the patient data from the patient information database(s), decrypt the data, and present the data to the requesting user.

For the entity's partners, such as laboratories that perform various health related test and transmit the results back to the entity, the partner labs can use the entity's public key to encrypt all the information regarding the results prior to transmission of the results back to the entity utilizing any of the existing data exchange methods such as HL7 (Health Level Seven). Once the data is received by the entity, it can be stored directly in the patient database. Alternatively, the patient lab results can be sent in clear text by the labs and upon receipt, passed along to DEE to be encrypted and stored in the patient database; however, this method does create potential exposure of patient information due to its clear text transmission prior to its receipt and encryption by the invention.

Reference has been made in this disclosure to some specific examples of the present invention, including any best modes contemplated by the inventor for carrying out the invention. Examples of these specific embodiments are illustrated in the accompanying figures. While the invention is described in conjunction with these specific embodiments, it will be understood that it is not intended to limit the invention to the described or illustrated embodiments. To the contrary, it is intended to cover alternatives, modifications, and equivalents as may be included within the spirit and scope of the invention as defined by the appended claims.

Various techniques and mechanisms of the present invention have sometimes been described in singular form for clarity. However, it should be noted that some embodiments include multiple iterations of a technique, or multiple mechanisms unless otherwise noted. Similarly, various steps of the methods shown and described herein are not necessarily performed in the order indicated, or performed at all in certain embodiments. Accordingly, some implementations of the methods discussed herein may include more or fewer steps than those shown or described. Further, the techniques and mechanisms of embodiments of the present invention may have described a connection, relationship or communication between two or more entities. It should be noted that such a connection or relationship between entities does not necessarily mean a direct, unimpeded connection, as a variety of other entities or processes may reside or occur between any two entities. Consequently, an indicated connection does not necessarily mean a direct, unimpeded connection unless otherwise noted.

Although the preceding descriptions, including the exemplary use cases, have sometimes referred to the actions of the vehicle owners, drivers, manufacturers, doctors, patients, businesses and employees who interact with the exemplary KDMA's of the present invention, such references are included solely for the purpose of more clearly illustrating how embodiments of the present invention operate and thereby enable computer functionality that cannot be achieved with or performed by conventional computing systems, conventional data security systems, or conventional encryption key management technology. Therefore, none of the human actions or business activities described herein should be construed as evidence that the claimed invention is directed to organizing human activity, which it is not. The invention is directed solely to the structural elements, functionality and methods of using the improved computer systems and computer networks as claimed, and not to the actions or activities of any of the people, organizations or business entities using embodiments of the claimed invention.

What is claimed is:

1. A process for managing encryption keys and encrypted electronic information on a network server, comprising:
   (A) acquiring on the network server a data owner's public key, a data owner's private key, a data owner's passcode, an authorized data recipient's public key, an authorized data recipient's private key and an authorized data recipient's passcode;
   (B) using data owner's passcode to encrypt the data owner's private key, and using the authorized data recipient's passcode to encrypt the authorized data recipient's private key;
   (C) saving the data owner's public key and the data owner's encrypted private key in a data owner keychain on a non-volatile secondary memory device connected to the network server, and saving the authorized data recipient's public key and the authorized data recipient's encrypted private key in an authorized data recipient keychain for the authorized data recipient on the non-volatile secondary memory device;
   (D) saving the data owner's private key and the authorized data recipient's private key only on a volatile memory device connected to the network server;
   (E) uploading a data owner's electronic information to the volatile memory device on the network server, encrypting the data owner's electronic information using the data owner's public key, and saving the data owner's encrypted electronic information on the non-volatile secondary memory device;
   (F) receiving on the network server an authorization from a data owner to give an authorized data recipient access to the data owner's encrypted electronic information saved on the non-volatile secondary memory device;
   (G) retrieving the data owner's encrypted private key from the data owner keychain, decrypting the data owner's encrypted private key using data owner's passcode, and saving data owner's decrypted private key only on the volatile memory device;
   (H) encrypting the data owner's private key using the authorized data recipient's public key and saving the data owner's encrypted private key in an authorized data recipient keychain for the authorized data recipient on the non-volatile secondary memory device;
   (I) receiving on the network server a request from a device or application operated or controlled by the authorized data recipient to access the data owner's encrypted electronic information saved on the non-volatile secondary memory device;
   (J) retrieving the authorized data recipient's encrypted private key from the authorized data recipient keychain on the non-volatile secondary memory device, decrypting the authorized data recipient's private key using the authorized data recipient's passcode, and saving the authorized data recipient's decrypted private key only on the volatile memory device;
   (K) decrypting the data owner's encrypted private key using the authorized data recipient's decrypted private key and saving the data owner's decrypted private key only on the volatile memory device;
(L) retrieving the data owner's encrypted electronic information from the non-volatile secondary memory device;
(M) decrypting the data owner's encrypted electronic information using the data owner's decrypted private key to produce on the volatile memory device a copy of the data owner's electronic information; and
(N) transmitting the copy of the data owner's electronic information from the volatile memory device on the network server to the device or application operated or controlled by the authorized data recipient.

2. The process of claim 1, wherein the data owner's decrypted electronic information, the data owner's decrypted private key and the authorized data recipient's decrypted private key are never saved on the non-volatile secondary memory device.

3. The process of claim 1, further comprising encrypting the copy of the data owner's electronic information with the authorize data recipient's public key prior to transmitting the copy of the data owner's electronic information to the device or application operated or controlled by the authorized data recipient.

4. The process of claim 1, further comprising:
(A) permitting the device or application operated or controlled by the authorized data recipient to log on to the network server prior to receiving the request to access the data owner's encrypted electronic information;
(B) in response to the log on, establishing on the network server an online session for the device or application by creating on the volatile memory device a session record for the online session, the session record comprising a session token for the device or application, the session token indicating a location in the volatile memory for the copy of the data owner's electronic information, the data owner's decrypted private key and the authorized data recipient's decrypted private key;
(C) automatically terminating the online session after transmitting the copy of the data owner's electronic information to the device or application operated or controlled by the authorized data recipient; and
(D) automatically deleting the session record from the volatile memory device when the online session is terminated.

5. The process of claim 1, further comprising:
(A) acquiring the data owner's public key and the data owner's private key on the network server by automatically generating the data owner's public key and the data owner's private key on the network server; and
(B) assigning the data owner's public key and the data owner's private key to the data owner.

6. The process of claim 1, further comprising:
(A) acquiring the authorized data recipient's public key and the authorized data recipient's private key on the network server by automatically generating the authorized data recipient's public key and the authorized data recipient's private key on the network server; and
(B) assigning the authorized data recipient's public key and the authorized data recipient's private key to the authorized data recipient.

7. The process of claim 1, further comprising:
(A) encrypting the data owner's passcode and saving the data owner's encrypted passcode in the data owner keychain on the non-volatile secondary memory device; and (B) encrypting the authorized data recipient's passcode and saving the authorized data recipient's encrypted passcode in the authorized data recipient keychain on the non-volatile secondary memory device.

8. The process of claim 7, wherein the data owner's passcode is encrypted using a cryptographic hash function (CHF) with a salt.

9. The process of claim 7, wherein the authorized data recipient's passcode is encrypted using a cryptographic hash function (CHF) with a salt.

10. The process of claim 7, further comprising:
(A) receiving on the network server a data owner's user ID and an authorized data recipient's user ID;
(B) saving the data owner's user ID, the data owner's public key and the authorized data recipient's user ID in the data owner keychain on the non-volatile secondary memory device; and
(C) saving the data owner's user ID, the authorized data recipient's user ID and the authorized data recipient's public key in the authorized data recipient keychain on the non-volatile secondary memory device.

11. The process of claim 10, further comprising:
(A) receiving on the network server an instruction from the data owner to revoke the authorization to give the authorized data recipient access to the data owner's electronic information saved on the non-volatile secondary memory device; and
(B) in response to receiving the instruction to revoke the authorization, removing the data owner's user ID and the data owner's encrypted private key from the authorized data recipient keychain.

12. A network server for storing and sharing encrypted electronic information, comprising:
(A) a microprocessor;
(B) a network interface for communicating with a device or application operated or controlled by a data owner and a device or application operated or controlled by an authorized data recipient's device over a data communications network,
(C) a volatile memory device;
(D) a non-volatile secondary memory device;
(E) a user credential manager on the volatile memory device comprising program instructions that, when executed by the microprocessor, will cause the microprocessor to
1) receive via the network interface a data owner's passcode, an authorized data recipient's passcode, a data owner's public key, a data owner's private key, an authorized data recipient's public key and an authorized data recipient's private key,
2) store the data owner's passcode, the data owner's private key, the authorized data recipient's passcode and the authorized data recipient's private key only on the volatile memory device,
3) encrypt the data owner's private key using the data owner's passcode and save the data owner's encrypted private key in a data owner keychain for the data owner on the non-volatile secondary memory device,
4) encrypt the authorized data recipient's private key using the authorized data recipient's passcode and save the authorized data recipient's encrypted private key in an authorized data recipient keychain for the authorized data recipient on the non-volatile secondary memory device;
(F) a session manager on the volatile memory device, the session manager comprising program instructions that, when executed by the microprocessor, will cause the microprocessor to upload electronic information of the data owner to the network server and store the data owner's electronic information only on the volatile memory device;

(G) a data encryption engine on the volatile memory device, the data encryption engine comprising program instructions that, when executed by the microprocessor, will cause the microprocessor to encrypt the data owner's electronic information using the data owner's public key, and store the data owner's encrypted electronic information on the non-volatile secondary memory device connected to the network server, (H) an authorization manager on the volatile memory device, the authorization manager comprising program instructions that, when executed by the microprocessor, will cause the microprocessor to 1) receive on the network server an authorization from a data owner to give the authorized data recipient access to the data owner's encrypted electronic information saved on the non-volatile secondary memory device
2) retrieve the data owner's encrypted private key from the data owner keychain on the non-volatile secondary memory device,
3) decrypt the data owner's encrypted private key using the data owner's passcode and store the data owner's decrypted private key only on the volatile memory device,
4) encrypt the data owner's private key using the authorized data recipient's public key and store the data owner's encrypted private key in an authorized data recipient keychain for the authorized data recipient on the non-volatile secondary memory device,
5) receive on the network server a request from a device or application operated or controlled by the authorized data recipient to access the data owner's encrypted electronic information stored on the non-volatile secondary memory device,
6) retrieve the authorized data recipient's encrypted private key from the authorized data recipient keychain on non-volatile secondary memory device,
7) decrypt the authorized data recipient's private key using the authorized data recipient's passcode and store the authorized data recipient's decrypted private key only on the volatile memory device,
8) decrypt the data owner's encrypted private key using the authorized data recipient's decrypted private key and store the data owner's decrypted private key only on the volatile memory device; and (I) a data decryption engine in the volatile memory device, the data decryption engine comprising program instructions that, when executed by the microprocessor, will cause the microprocessor to decrypt the data owner's encrypted electronic information using the authorized data recipient's decrypted private key to produce on the volatile memory device a copy of the data owner's electronic information;

(J) wherein the session manager further comprises program instructions that, when executed by the microprocessor, will cause the microprocessor to transmit the copy of the data owner's electronic information from the volatile memory device to the device or application operated by the authorized data recipient.

13. The network server of claim 12, further comprising generating the data owner's public key and the data owner's private key on the network server.

14. The network server of claim 12, further comprising generating the authorized data recipient's public key and the authorized data recipient's private key on the network server.

15. The network server of claim 12, wherein the session manager further comprises program instructions that, when executed by the microprocessor, will cause the microprocessor to (A) permit the device or application operated or controlled by the authorized data recipient to log on to the network server prior to receiving on the network server the request to access the data owner's encrypted electronic information;
(B) in response to the log on, establish on the network server an online session for the device or application by creating on the volatile memory device a session record for the online session, the session record comprising a session token for the device or application, the session token indicating a location in the volatile memory for the copy of the data owner's electronic information, the data owner's decrypted private key and the authorized data recipient's decrypted private key;
(C) automatically terminate the online session after transmitting the copy of the data owner's electronic information to the device or application operated or controlled by the authorized data recipient; and
(D) automatically delete the session record from the volatile memory device when the online session is terminated.

16. The network server of claim 12, wherein the user credential manager further comprises program instructions that, when executed by the microprocessor, will cause the microprocessor to (A) encrypt the data owner's passcode and store the data owner's encrypted passcode in the data owner keychain on the non-volatile secondary memory device; and
(B) encrypt the authorized data recipient's passcode and store the authorized data recipient's encrypted passcode in the authorized data recipient keychain on the non-volatile secondary memory device.

17. The network server of claim 16, wherein the data owner's passcode is encrypted using a cryptographic hash function (CHF) with a salt.

18. The network server of claim 16, wherein the authorized data recipient's passcode is encrypted using a cryptographic hash function (CHF) with a salt.

19. The network server of claim 16, wherein the authorization manager further comprises program instructions that, when executed by the microprocessor, will cause the microprocessor to:

(A) receive on the network server a data owner's user ID and an authorized data recipient's user ID;
(B) store the data owner's user ID, the data owner's public key and the authorized data recipient's user ID in the data owner keychain on the non-volatile secondary memory device; and
(C) store the data owner's user ID, the authorized data recipient's user ID and the authorized data recipient's public key in the authorized data recipient keychain on the non-volatile secondary memory device.

20. The network server of claim 19, wherein the authorization manager further comprises program instructions that, when executed by the microprocessor, will cause the microprocessor to:

(A) receive on the network server an instruction from the data owner to revoke the authorization to give the authorized data recipient access to the data owner's electronic information stored on the non-volatile secondary memory device; and
(B) in response to receiving the instruction to revoke the authorization, remove the data owner's user ID and the data owner's encrypted private key from the authorized data recipient keychain.

21. A network server, comprising:
(A) a microprocessor;
(B) a volatile memory storage device for receiving and storing a data owner's electronic information, a data owner's passcode, a data owner's public key, a data owner's private key, an authorized data recipient's passcode, an authorized data recipient's public key and an authorized data recipient's private key;
(C) a credential manager operable with the microprocessor to encrypt the data owner's private key using the data owner's passcode, to save the data owner's encrypted private key in a data owner keychain for the data owner on the non-volatile secondary memory device, to encrypt the authorized data recipient's private key using the authorized data recipient's passcode, and to save the authorized data recipient's encrypted private key in an authorized data recipient keychain for the authorized data recipient on the non-volatile secondary memory device;
(D) an authorization manager operable with the microprocessor to
  1) decrypt the data owner's encrypted private key using the data owner's passcode and store the data owner's decrypted private key only on the volatile memory device,
  2) encrypt the data owner's private key using the authorized data recipient's public key and store the data owner's encrypted private key in an authorized data recipient keychain for the authorized data recipient on the non-volatile secondary memory device,
  3) decrypt the authorized data recipient's private key using the authorized data recipient's passcode and store the authorized data recipient's decrypted private key only on the volatile memory device,
  4) decrypt the data owner's encrypted private key using the authorized data recipient's decrypted private key and store the data owner's decrypted private key only on the volatile memory device;
(E) a session manager operable with the microprocessor to transmit a copy of the data owner's electronic information from the volatile memory device to the device or application operated by the authorized data recipient.

22. The network server of claim 21, further comprising:
(A) a data encryption engine operable with the microprocessor to encrypt the data owner's electronic information using the data owner's public key, and store the data owner's encrypted electronic information on the non-volatile secondary memory device; and
(B) a data decryption engine operable with the microprocessor to decrypt the data owner's encrypted electronic information using the authorized data recipient's decrypted private key to generate the copy of the data owner's electronic information on the volatile memory device.

23. The network server of claim 21, wherein the session manager is further operable with the microprocessor to
(A) permit a device or application operated or controlled by the authorized data recipient to log on to the network server;
(B) in response to the log on, establish on the network server an online session for the device or application by creating on the volatile memory device a session record for the online session, the session record comprising a session token for the device or application, the session token indicating a location in the volatile memory for the copy of the data owner's electronic information, the data owner's decrypted private key and the authorized data recipient's decrypted private key;
(C) automatically terminate the online session when the device or application operated or controlled by the authorized data recipient logs out; and
(D) automatically delete the session record and all of the data therein from the volatile memory device when the online session is terminated.

* * * * *